Figure 1:
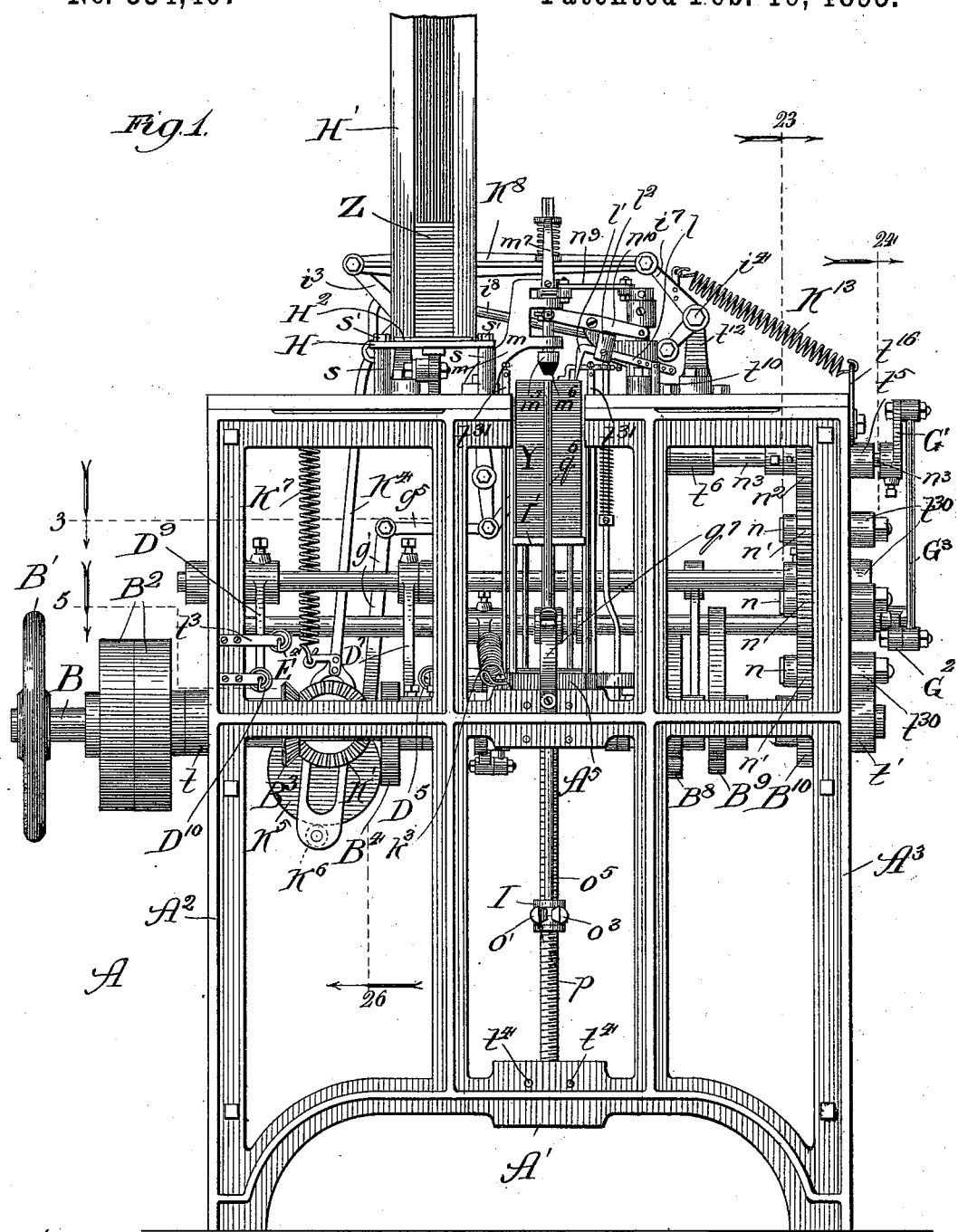

(No Model.) 24 Sheets—Sheet 1.
F. B. REDINGTON & C. U. TROWBRIDGE.
WRAPPING MACHINE.

No. 534,407. Patented Feb. 19, 1895.

Witnesses:
Chas. E. Gaylord,
Lute J. Alter.

Inventors:
Frank B. Redington,
Charles U. Trowbridge,
By Dyrenforth & Dyrenforth
Attys.

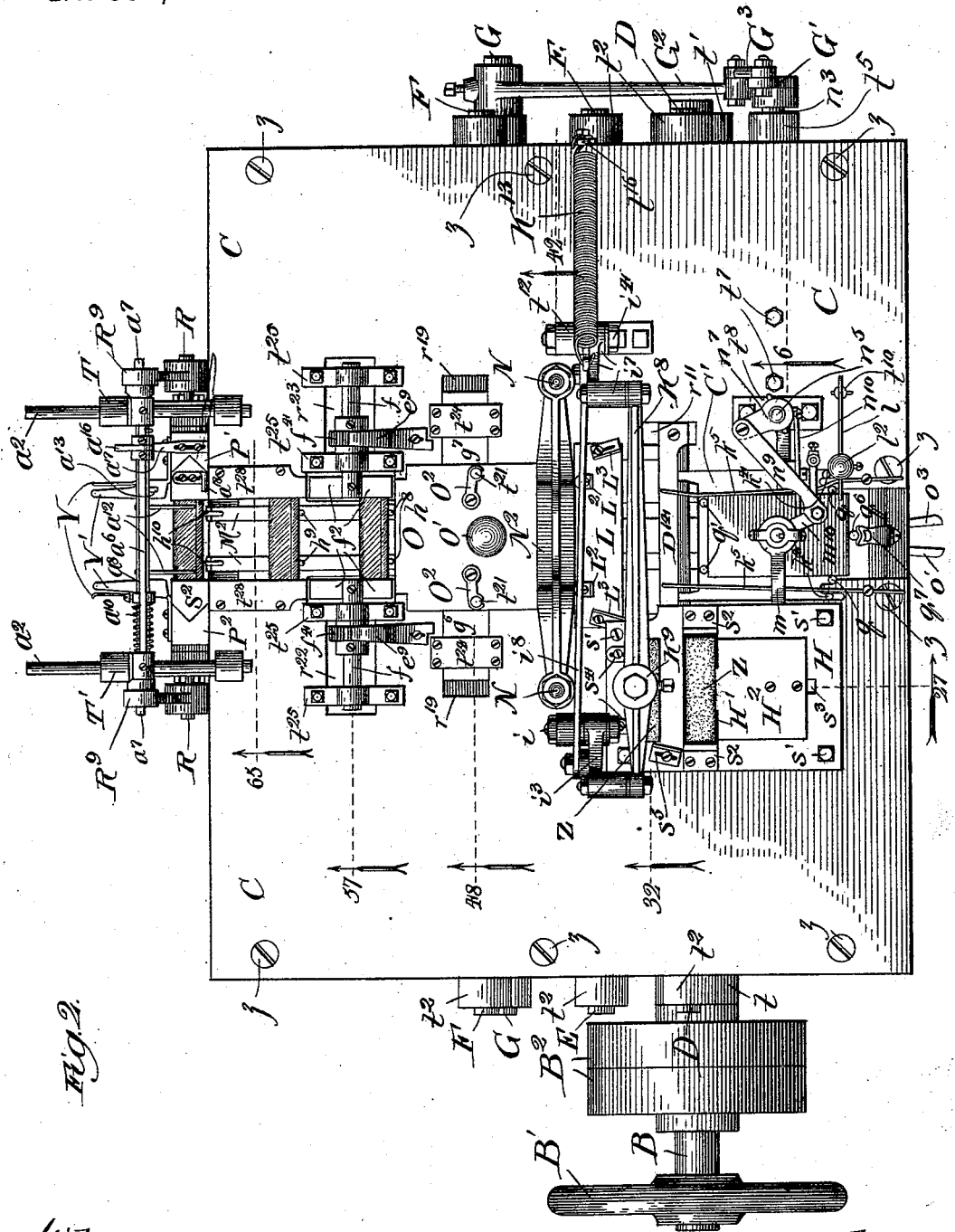

(No Model.) 24 Sheets—Sheet 3.
F. B. REDINGTON & C. U. TROWBRIDGE.
WRAPPING MACHINE.
No. 534,407. Patented Feb. 19, 1895.
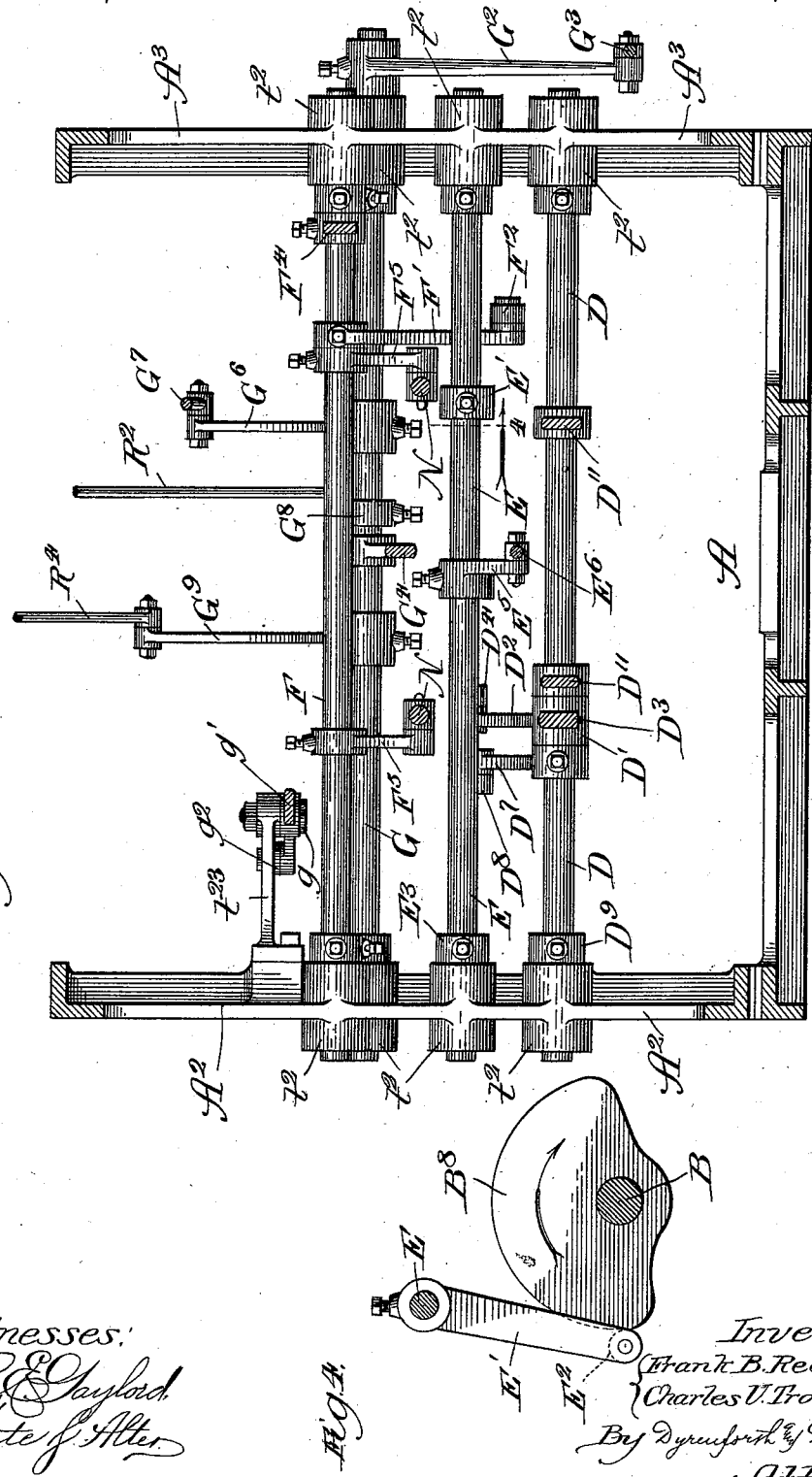

(No Model.) 24 Sheets—Sheet 4.

F. B. REDINGTON & C. U. TROWBRIDGE.
WRAPPING MACHINE.

No. 534,407. Patented Feb. 19, 1895.

Witnesses:

Inventors:
Frank B. Redington,
Charles U. Trowbridge,
By Dyrenforth & Dyrenforth,
Attys.

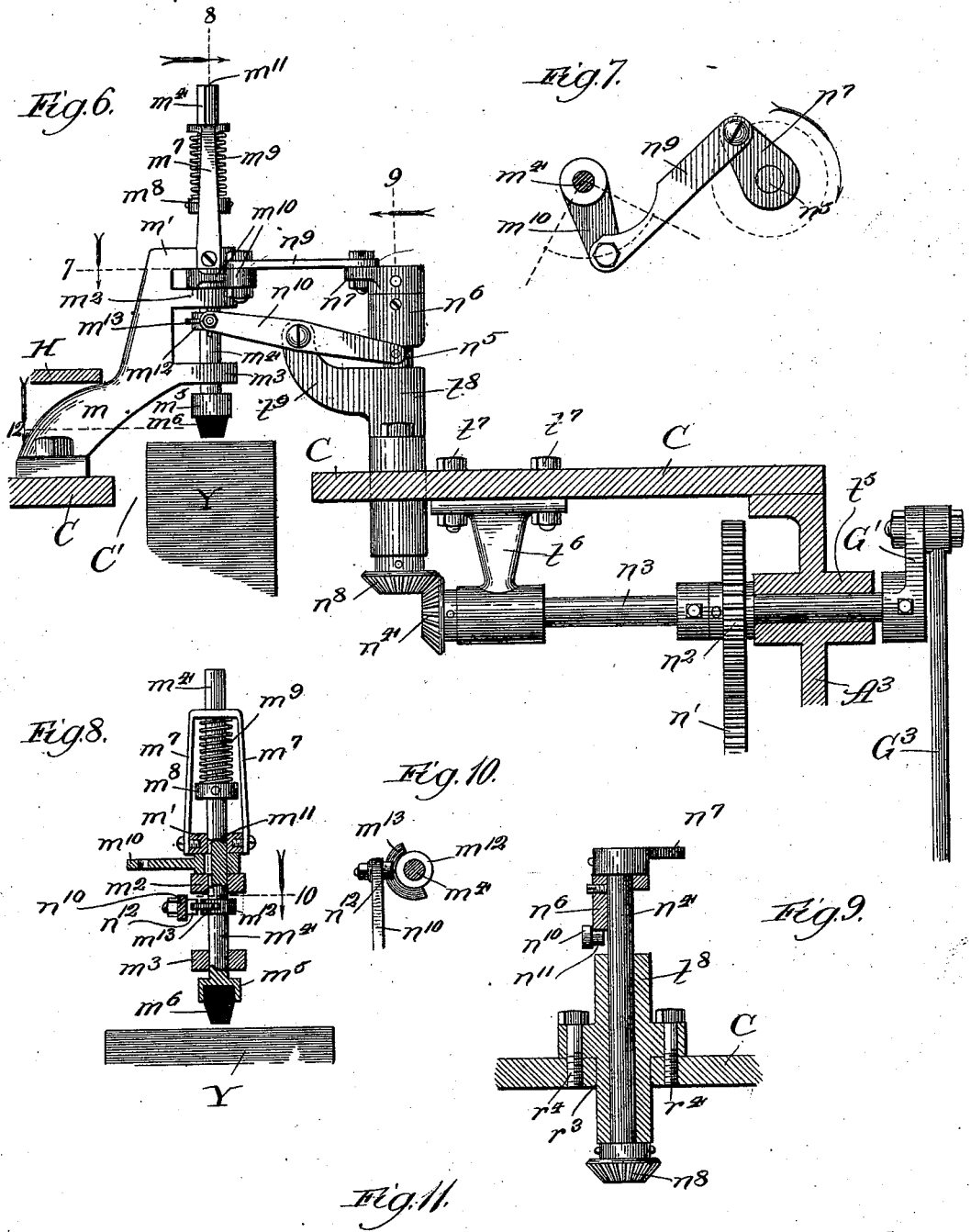

(No Model.) 24 Sheets—Sheet 6.
F. B. REDINGTON & C. U. TROWBRIDGE.
WRAPPING MACHINE.
No. 534,407. Patented Feb. 19, 1895.
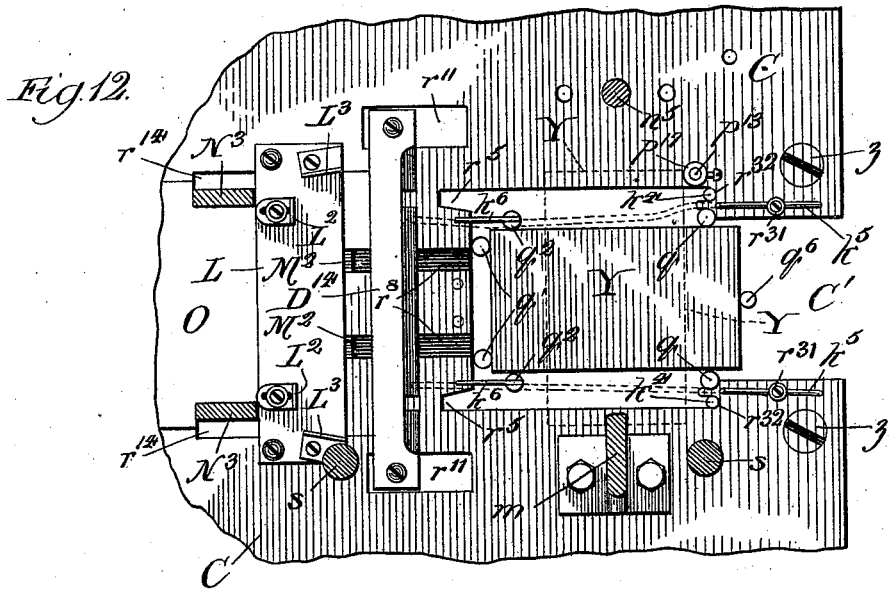
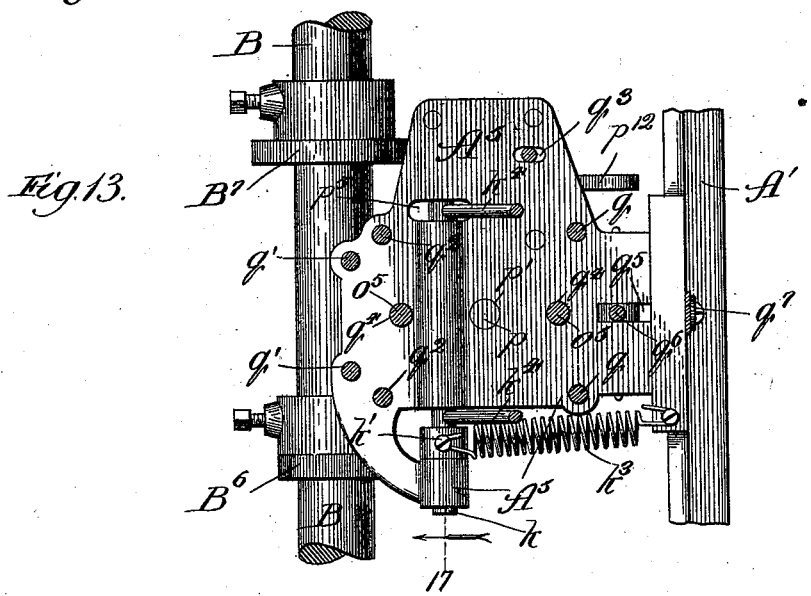
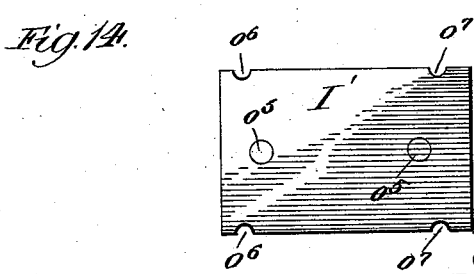
Witnesses:
Inventors:
Frank B. Redington,
Charles U. Trowbridge,
By Dyrenforth & Dyrenforth,
Attys.

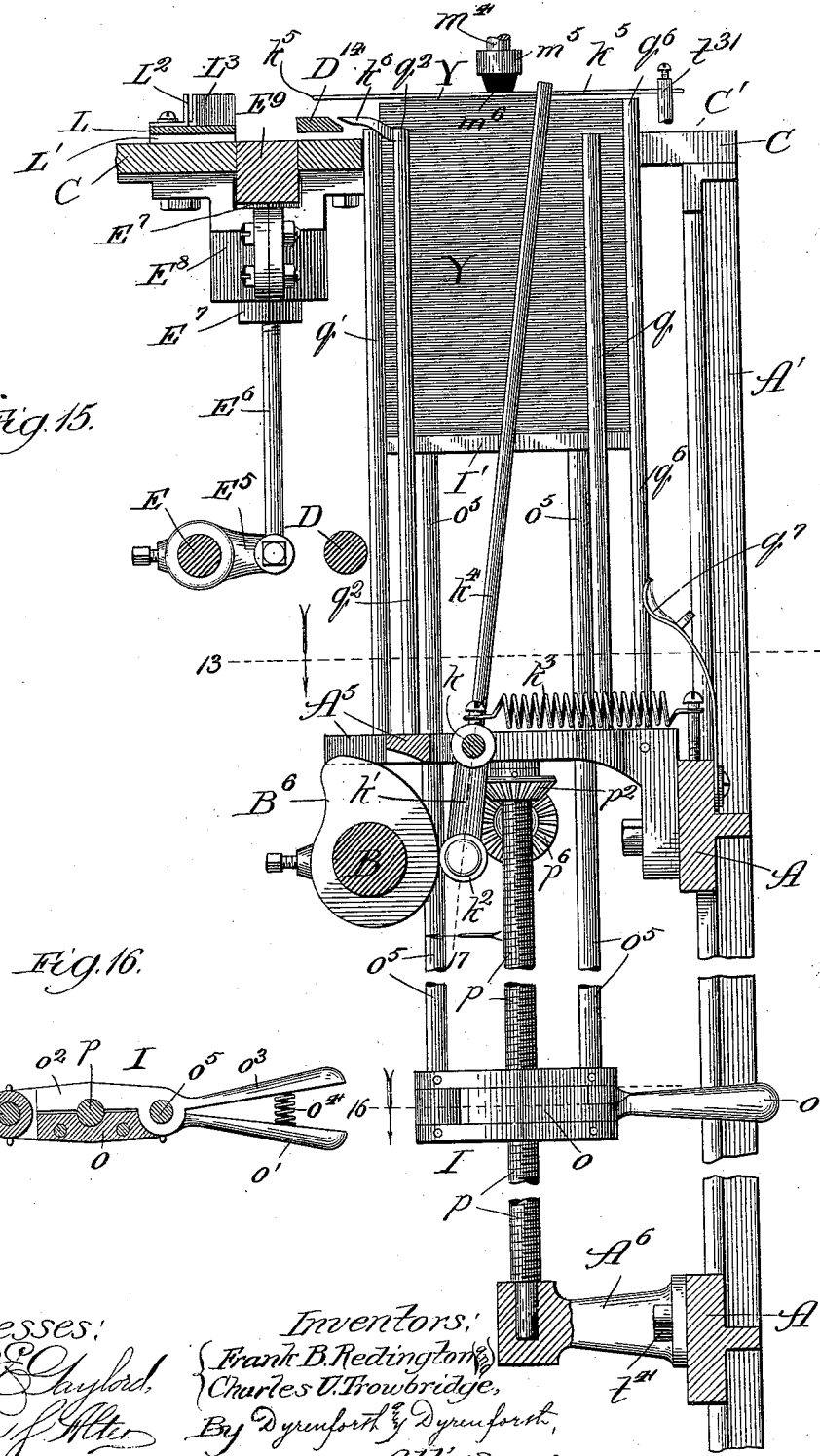

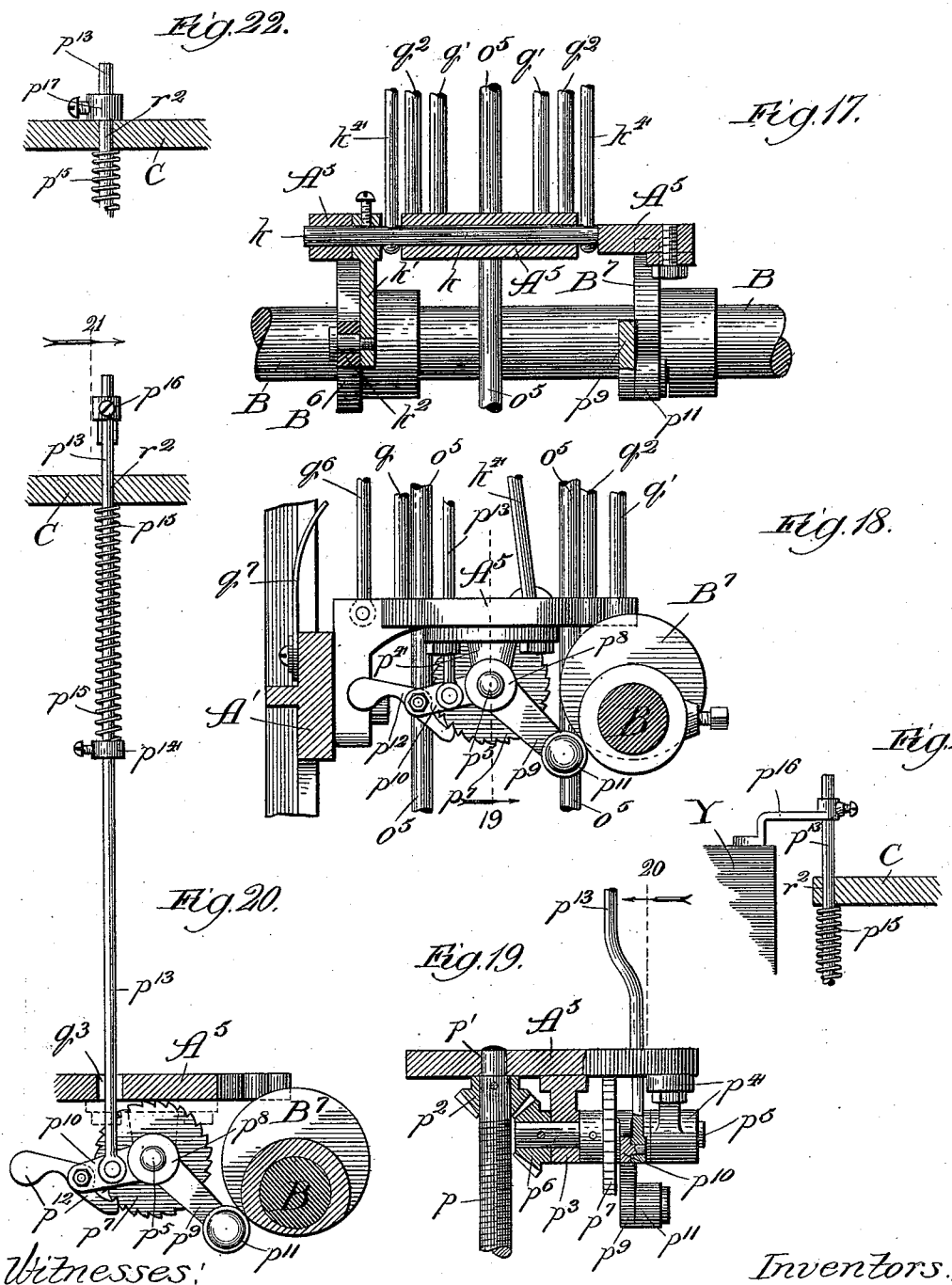

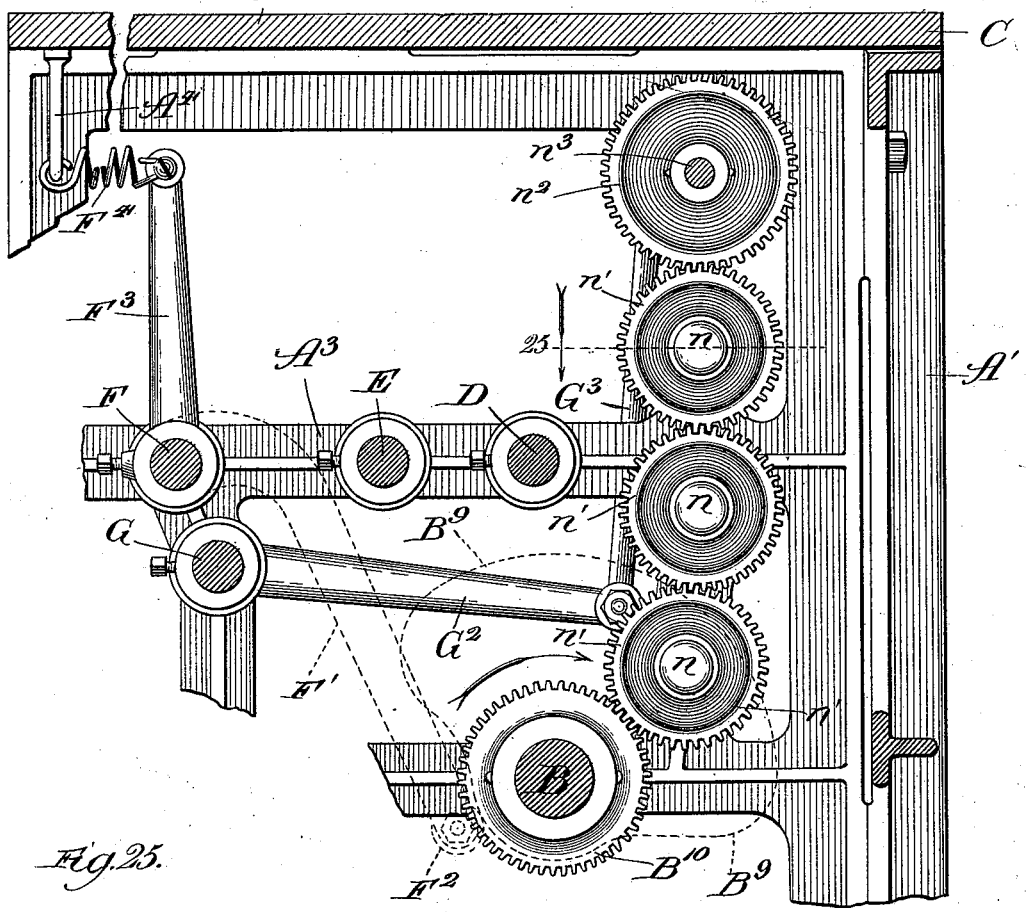
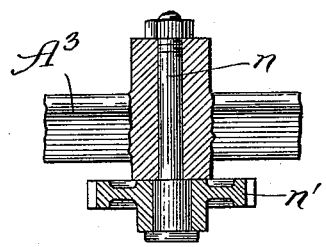
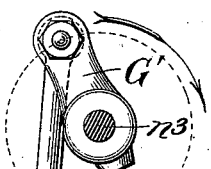
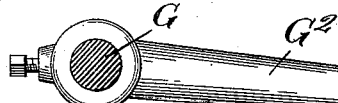

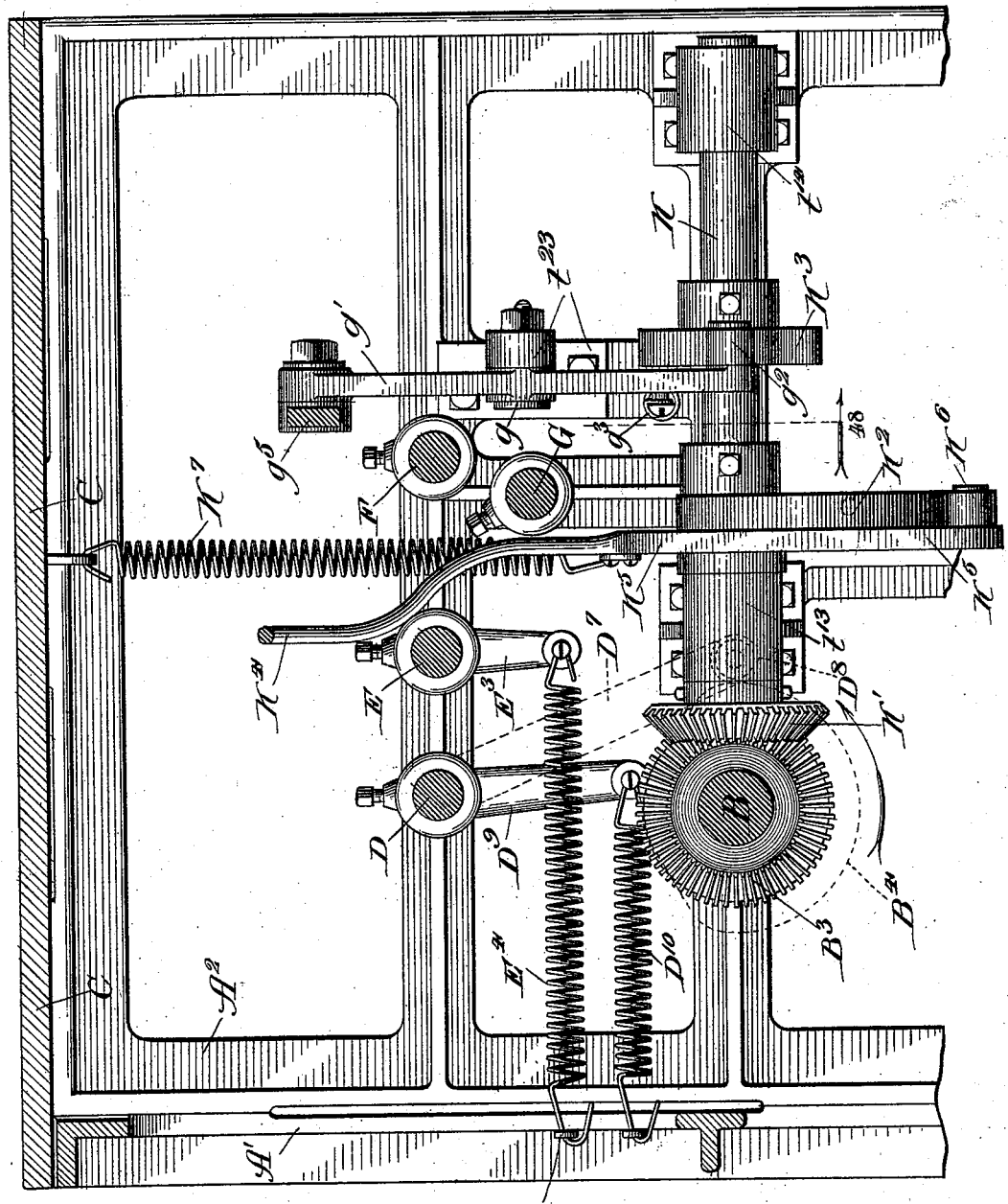

(No Model.) 24 Sheets—Sheet 11.
F. B. REDINGTON & C. U. TROWBRIDGE.
WRAPPING MACHINE.
No. 534,407. Patented Feb. 19, 1895.
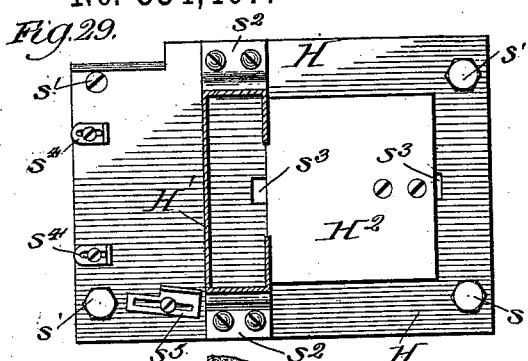
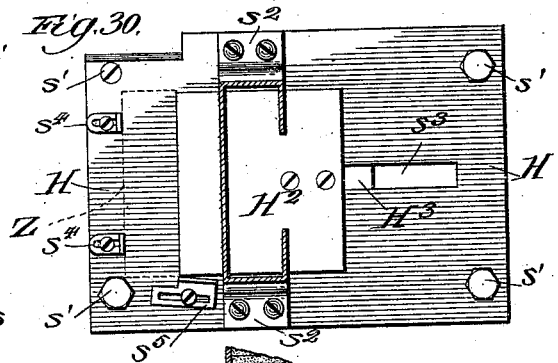
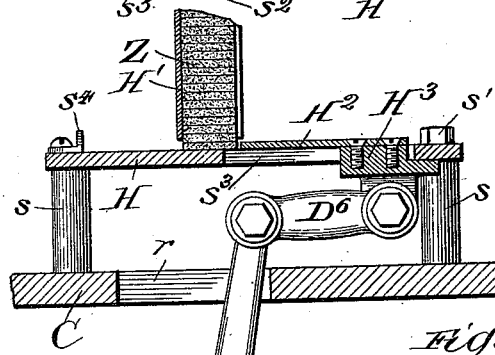
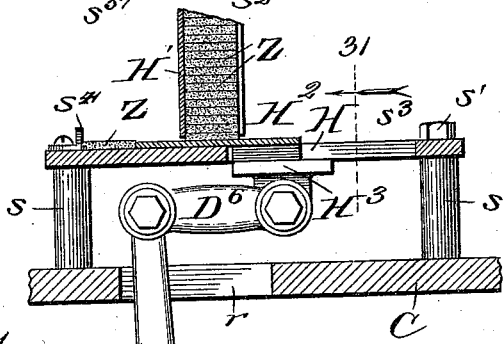
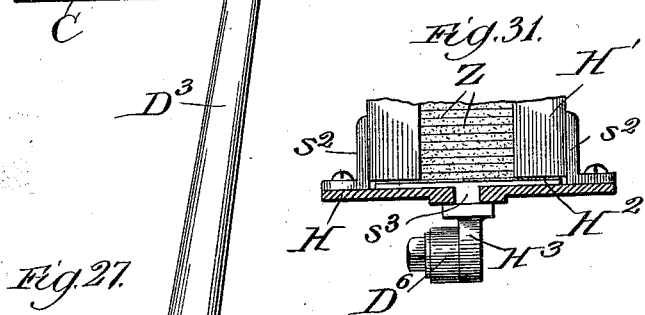
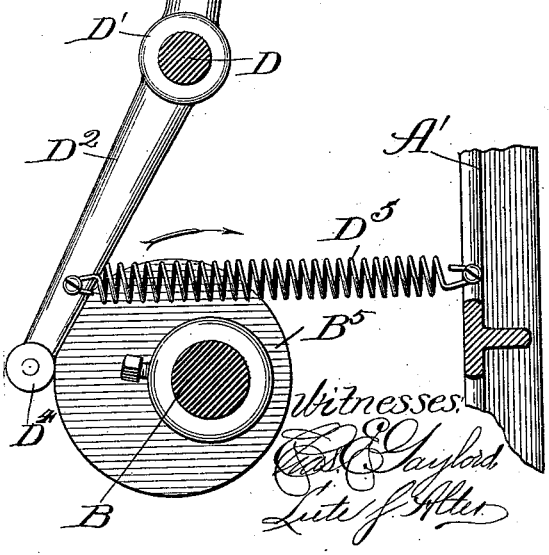
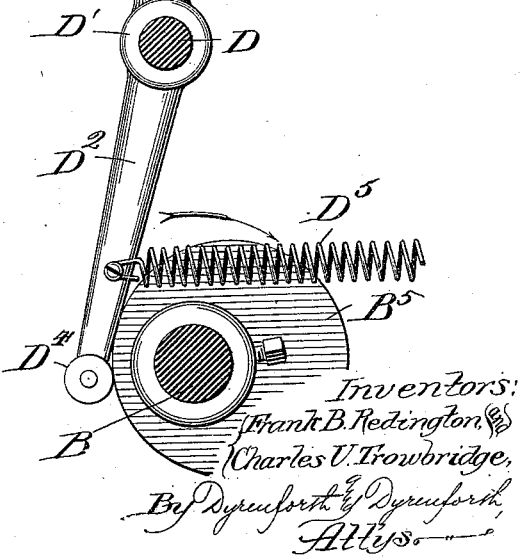
Witnesses:
Inventors:
Frank B. Redington,
Charles U. Trowbridge,
By Dyrenforth & Dyrenforth,
Attys.

(No Model.) 24 Sheets—Sheet 12.
F. B. REDINGTON & C. U. TROWBRIDGE.
WRAPPING MACHINE.
No. 534,407. Patented Feb. 19, 1895.
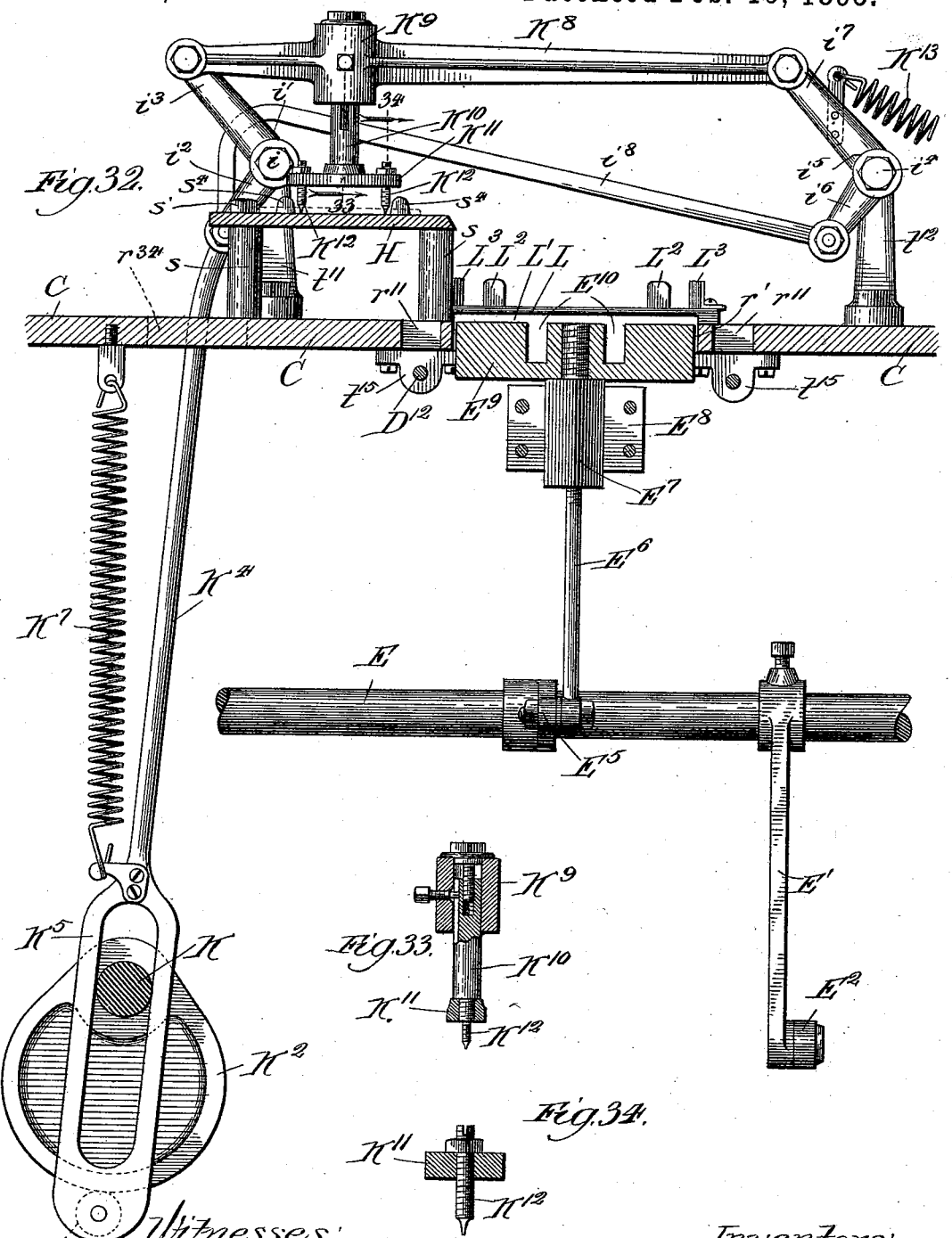
Witnesses:
Inventors:
Frank B. Redington
Charles U. Trowbridge,
By Dyrenforth & Dyrenforth,
Attys.

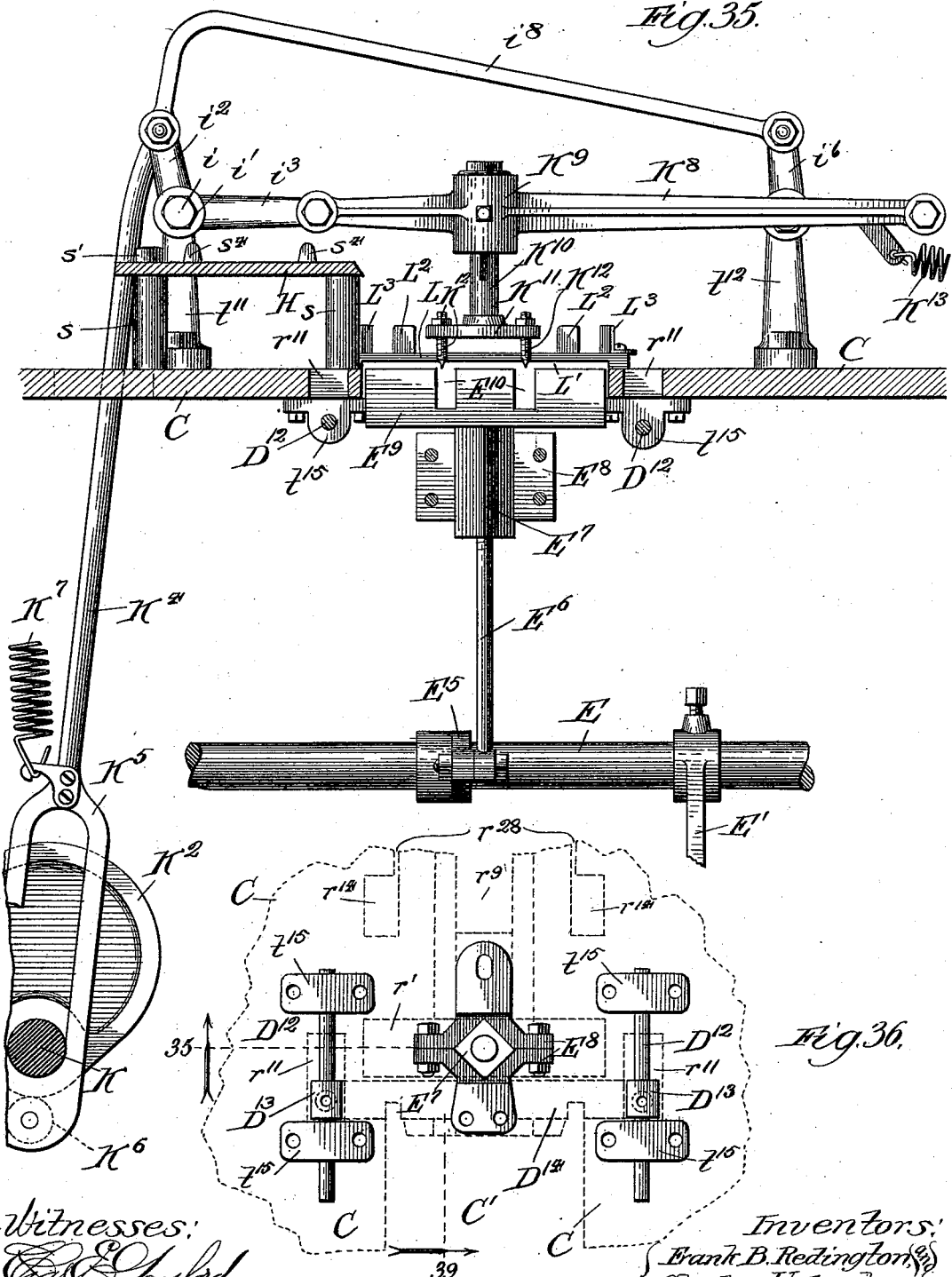

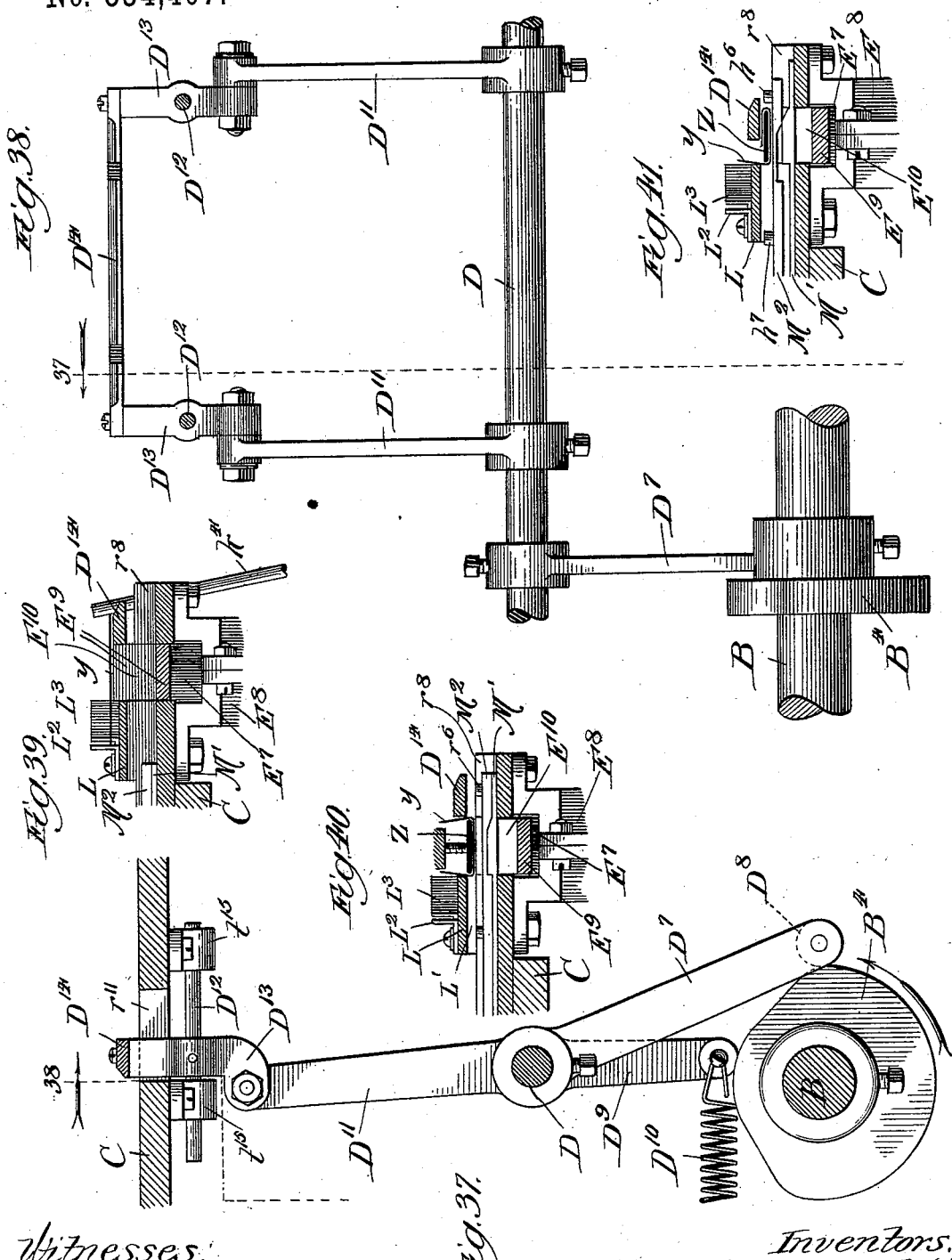

(No Model.) 24 Sheets—Sheet 15.
F. B. REDINGTON & C. U. TROWBRIDGE.
WRAPPING MACHINE.
No. 534,407. Patented Feb. 19, 1895.
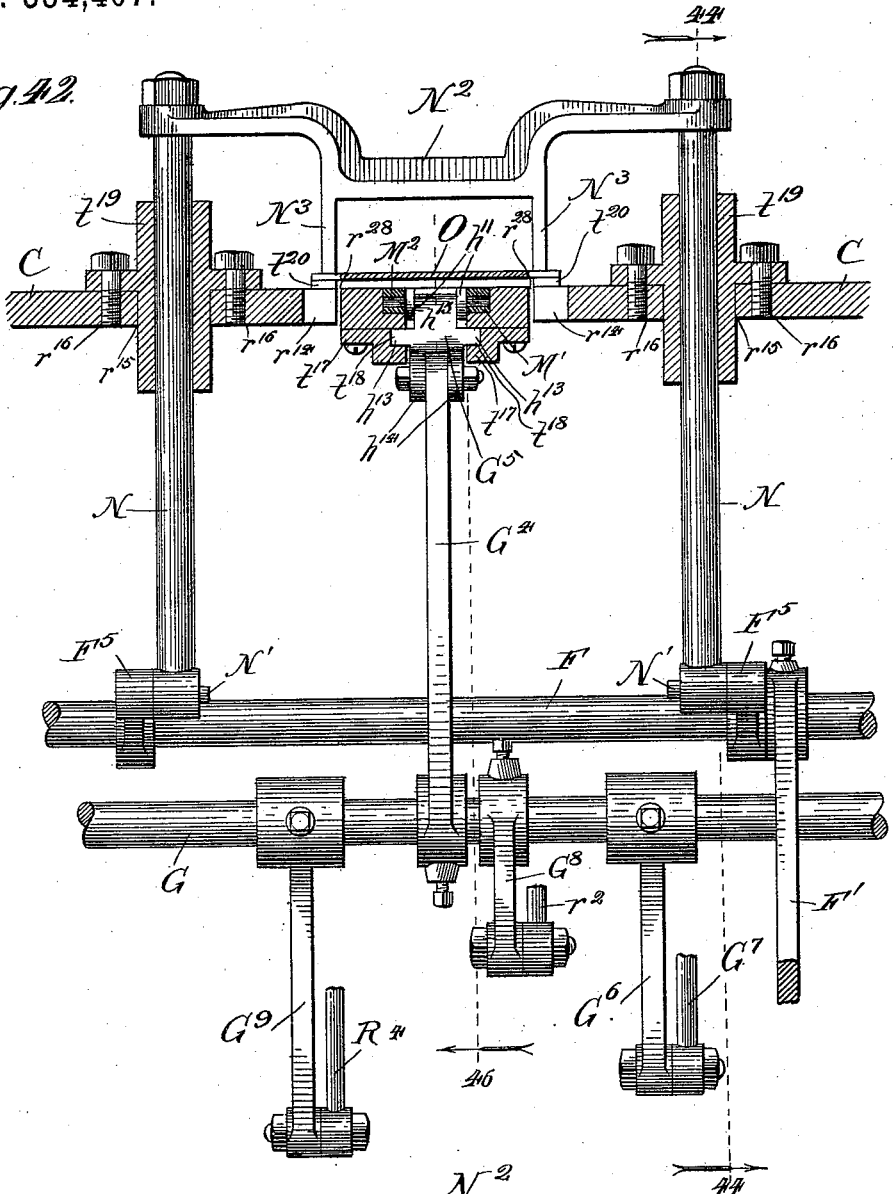
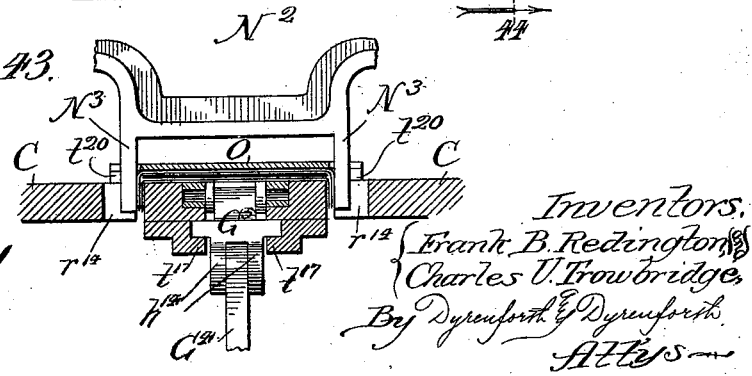
Witnesses:
Chas. E. Gaylord
Lute J. Ritter
Inventors:
Frank B. Redington
Charles U. Trowbridge
By Dyrenforth & Dyrenforth
Attys (No Model.) 24 Sheets—Sheet 16.
F. B. REDINGTON & C. U. TROWBRIDGE.
WRAPPING MACHINE.
No. 534,407. Patented Feb. 19, 1895.
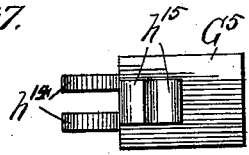
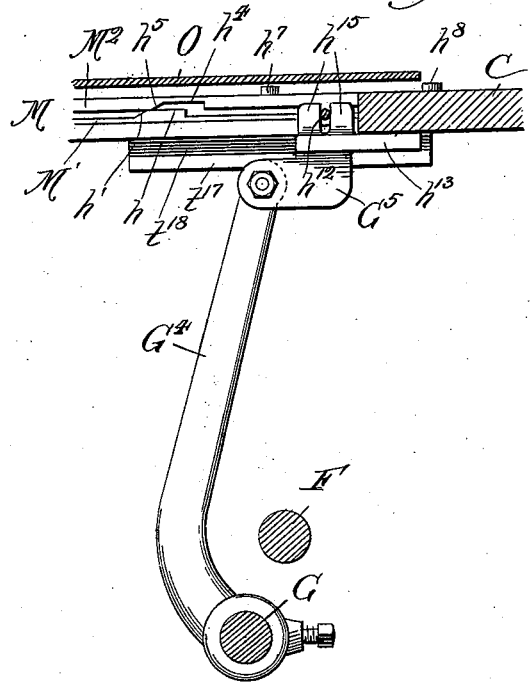
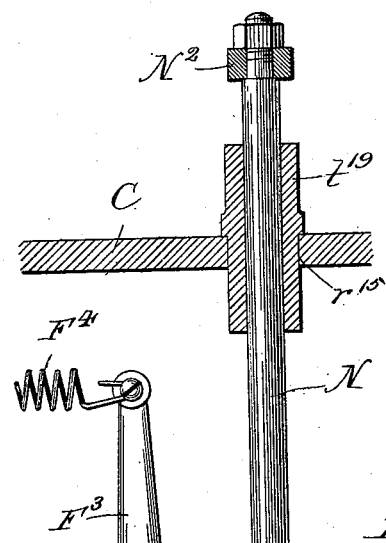
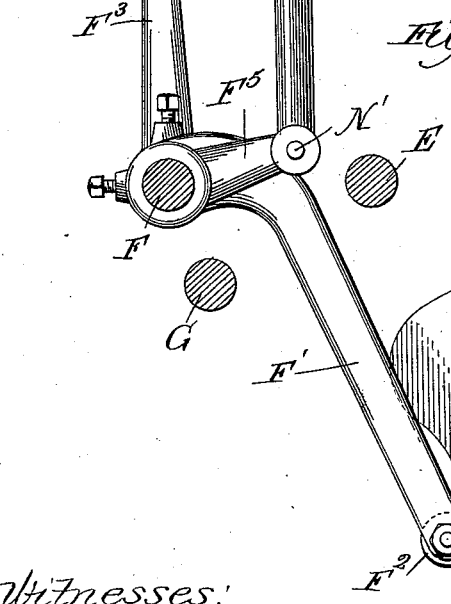
Witnesses:
Inventors:
Frank B. Redington,
Charles U. Trowbridge,
By Dyrenforth & Dyrenforth,
Attys.

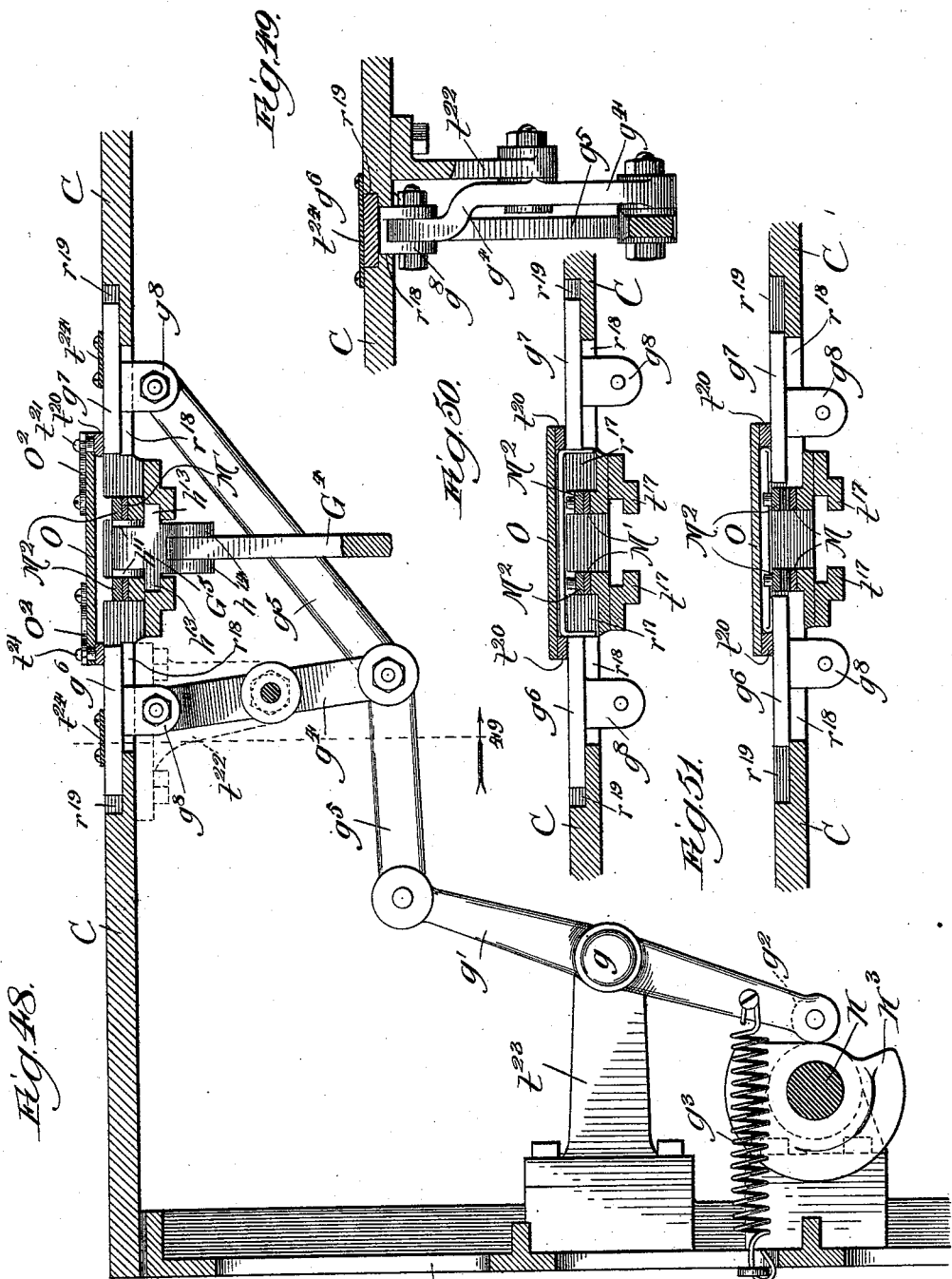

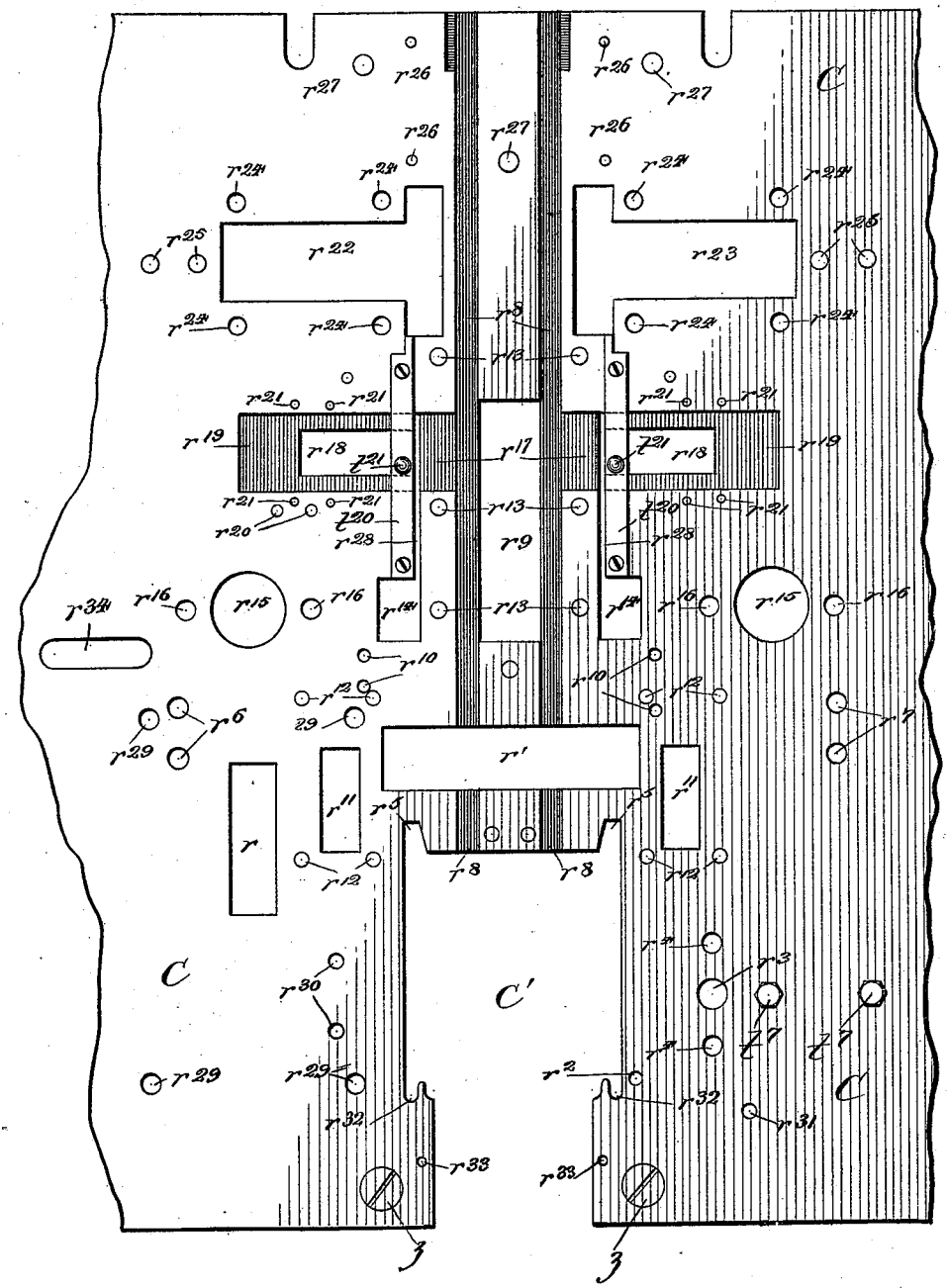

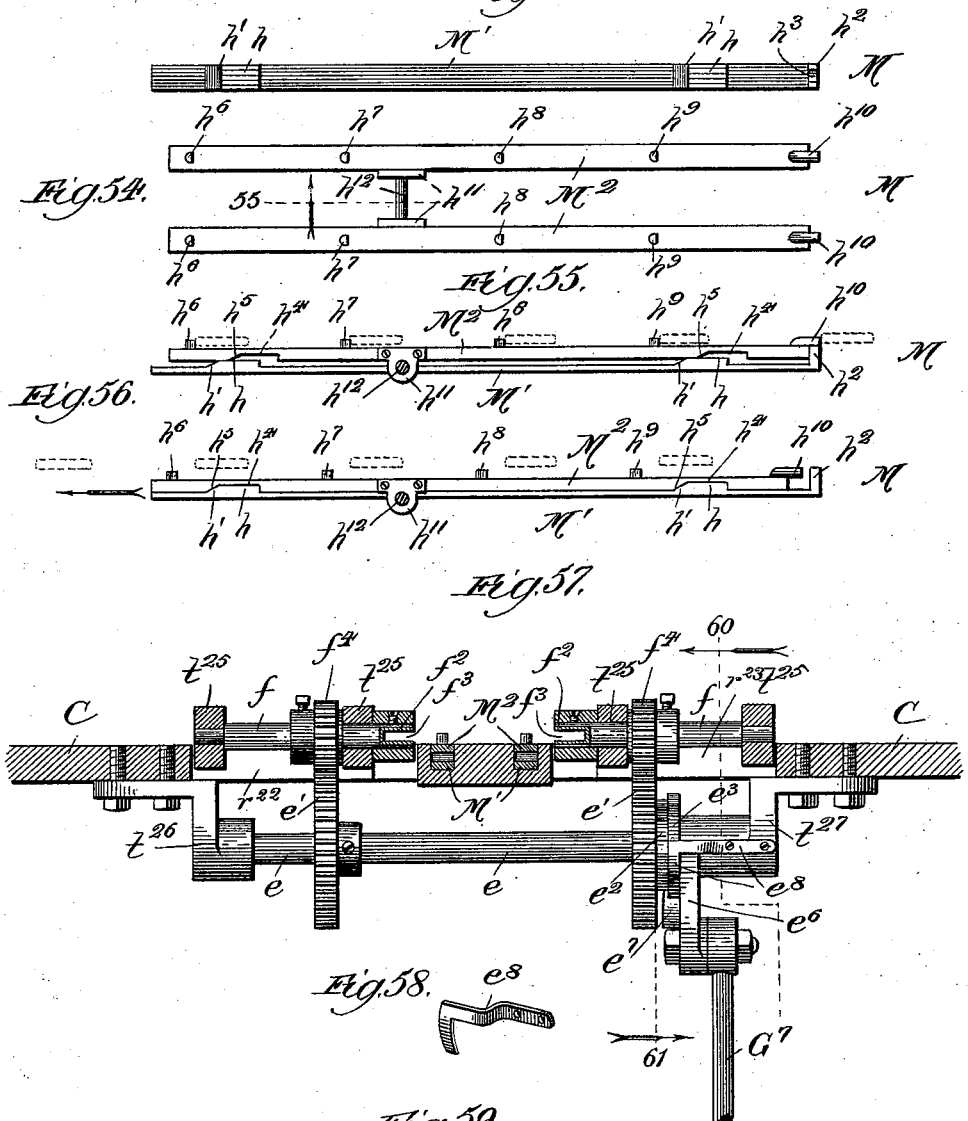

(No Model.) 24 Sheets—Sheet 20.
F. B. REDINGTON & C. U. TROWBRIDGE.
WRAPPING MACHINE.
No. 534,407. Patented Feb. 19, 1895.
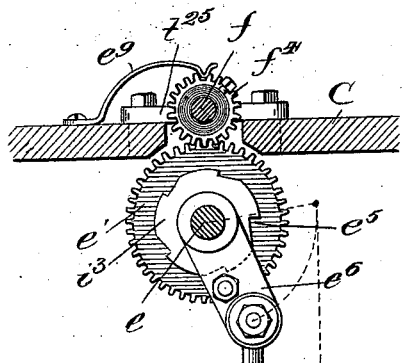
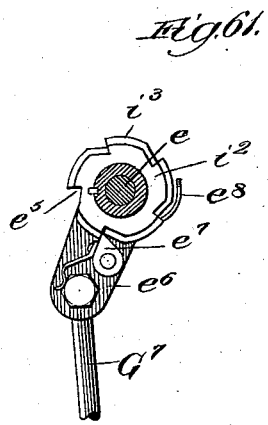
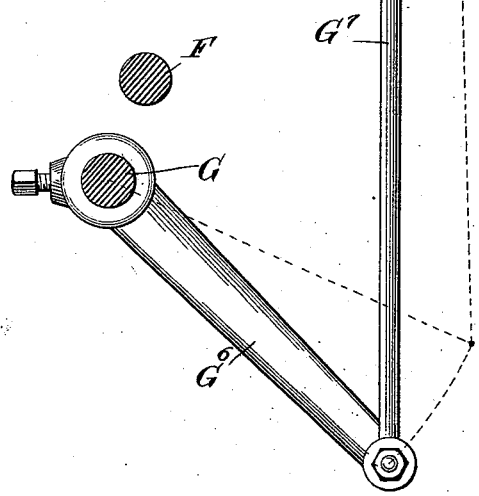
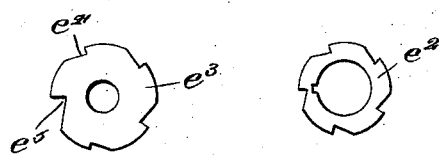
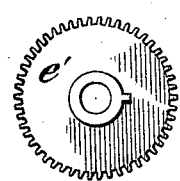
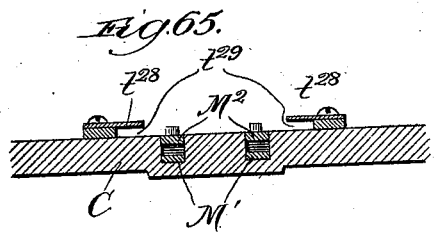
Witnesses:
Inventors:
Frank B. Redington,
Charles U. Trowbridge,
By Dyrenforth & Dyrenforth,
Att'ys (No Model.) 24 Sheets—Sheet 21.
F. B. REDINGTON & C. U. TROWBRIDGE.
WRAPPING MACHINE.
No. 534,407. Patented Feb. 19, 1895.
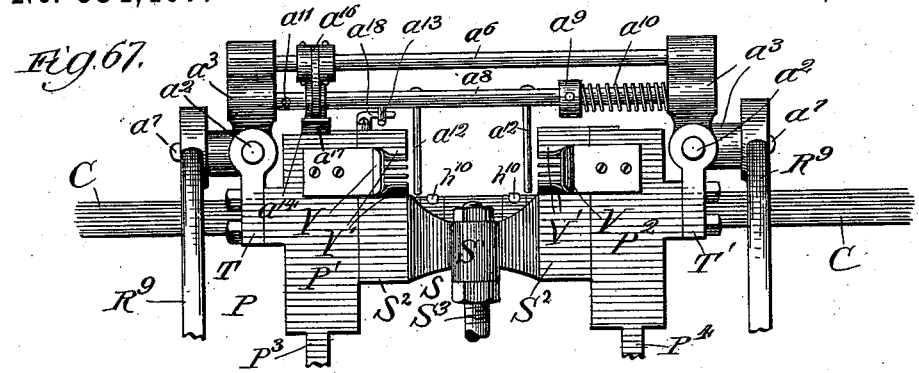
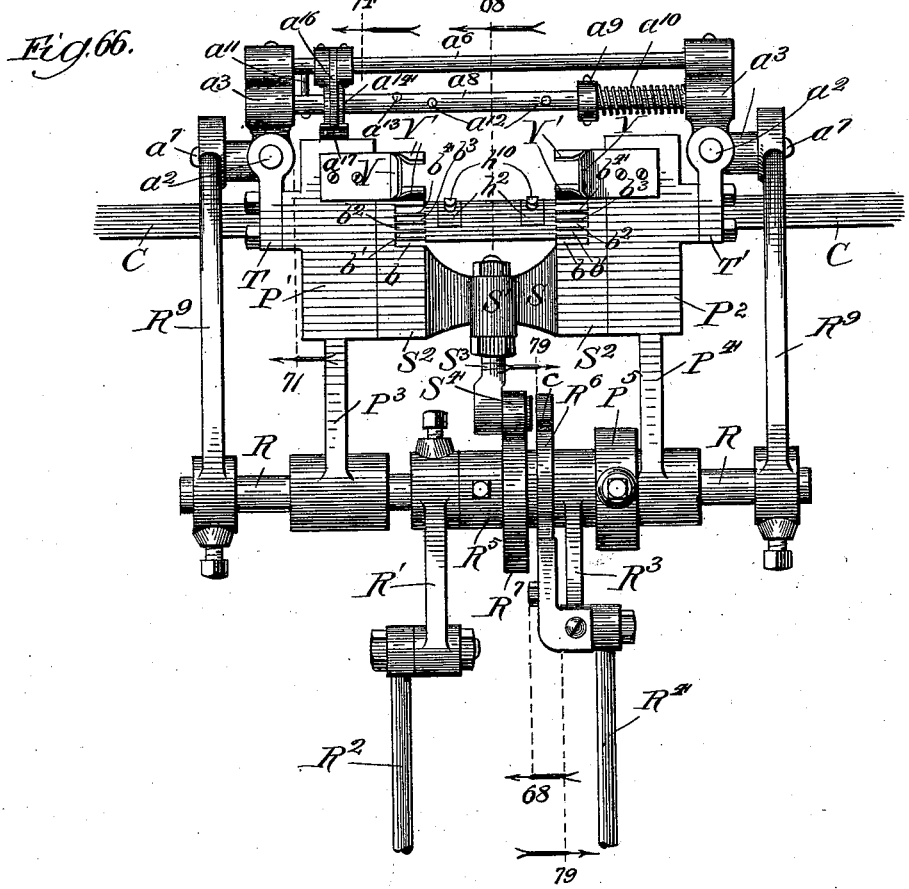

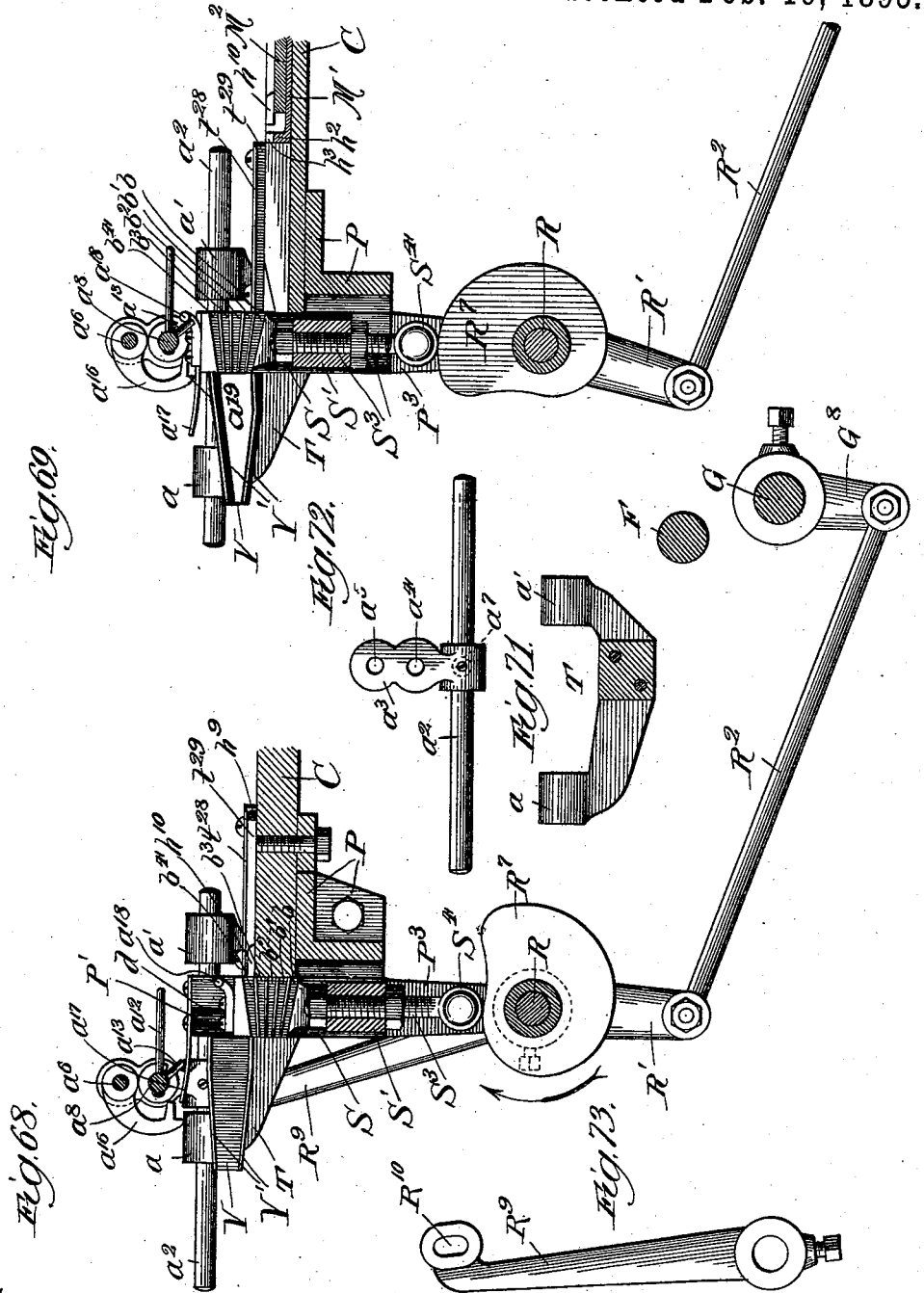

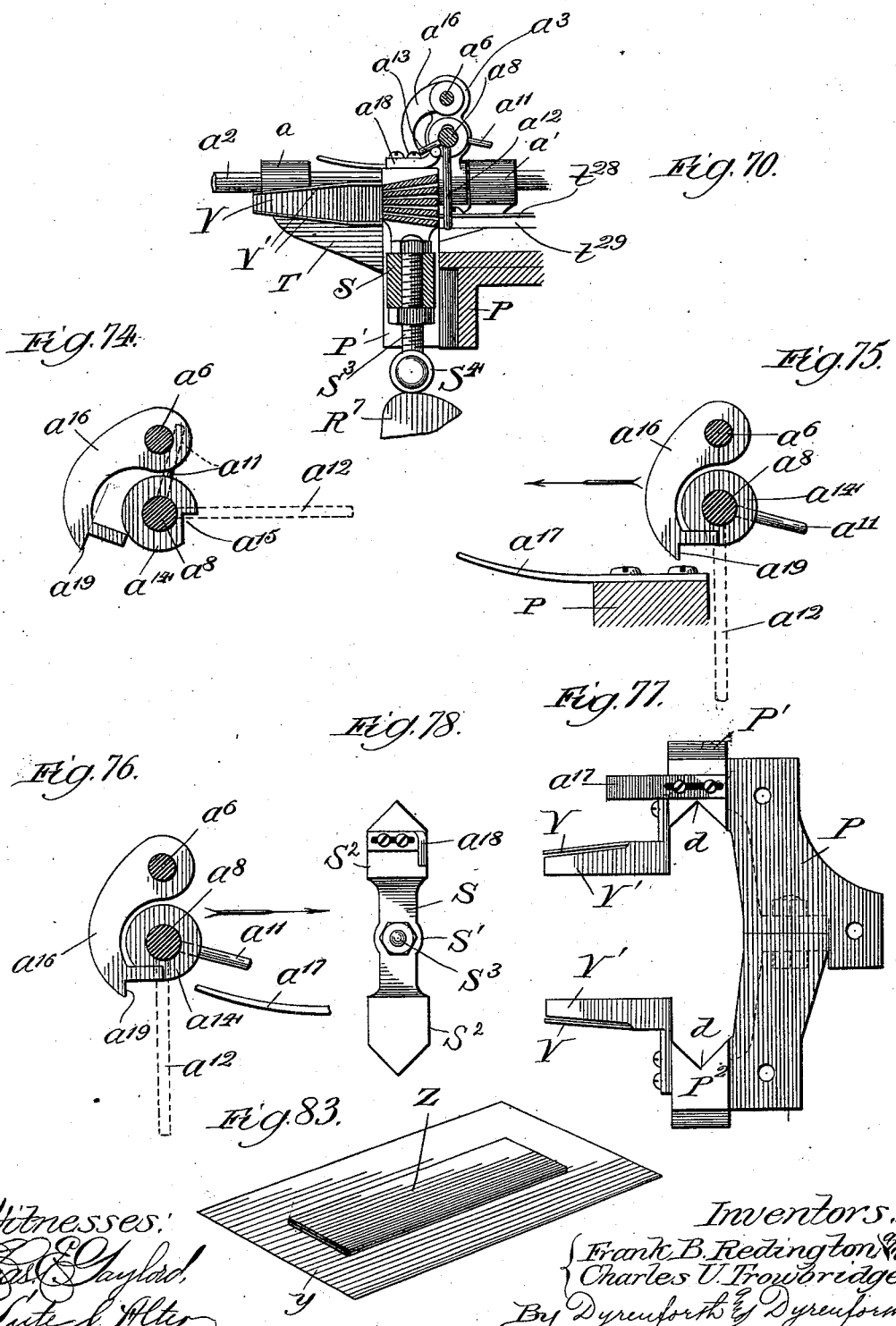

(No Model.) 24 Sheets—Sheet 24.
F. B. REDINGTON & C. U. TROWBRIDGE.
WRAPPING MACHINE.
No. 534,407. Patented Feb. 19, 1895.
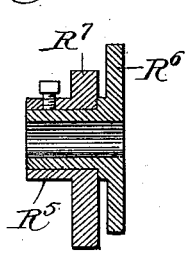
Fig. 82.
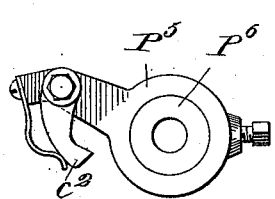
Fig. 80.
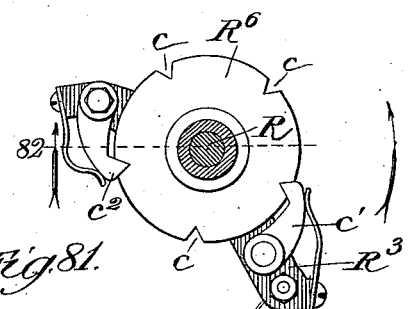
Fig. 79.
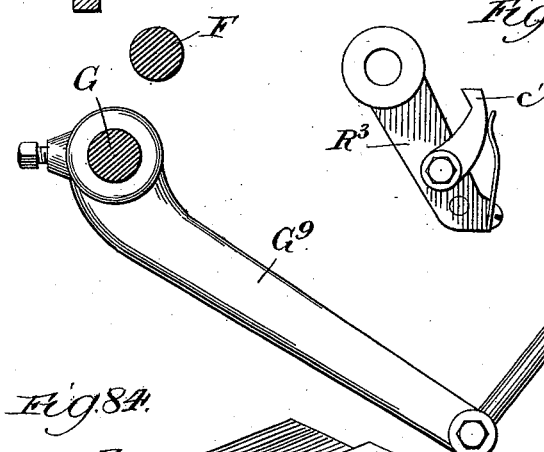
Fig. 81.
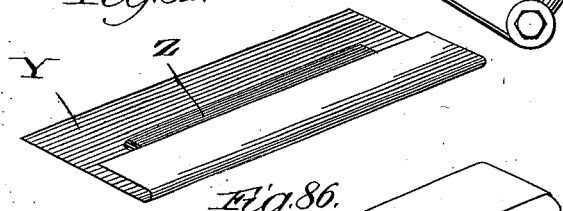
Fig. 84.
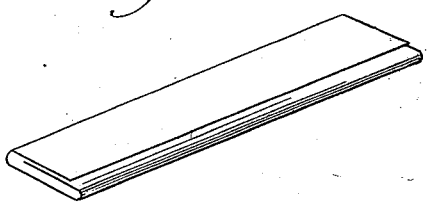
Fig. 85.
Fig. 86.
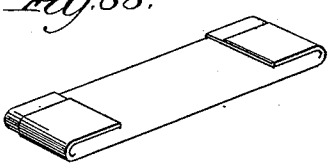
Fig. 87.
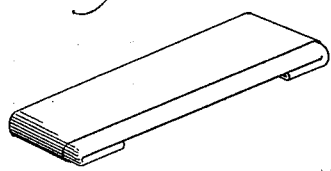
Fig. 88.
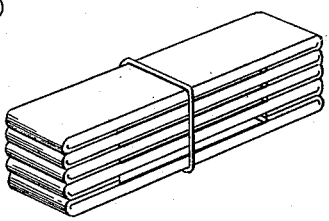
Fig. 89.
Witnesses:
Chas. E. Gaylord
Lute J. After
Inventors:
Frank B. Redington
Charles U. Trowbridge
By Dyrenforth & Dyrenforth
Attys.
THE NORRIS PETERS CO., PHOTO-LITHO., WASHINGTON, D. C.

UNITED STATES PATENT OFFICE.

FRANK B. REDINGTON AND CHARLES U. TROWBRIDGE, OF CHICAGO, ILLINOIS.

WRAPPING-MACHINE.

SPECIFICATION forming part of Letters Patent No. 534,407, dated February 19, 1895.

Application filed May 23, 1894. Serial No. 512,192. (No model.)

*To all whom it may concern:*

Be it known that we, FRANK B. REDINGTON and CHARLES U. TROWBRIDGE, citizens of the United States, residing at Chicago, in the county of Cook and State of Illinois, have invented a new and useful Improvement in Wrapping-Machines, of which the following is a specification.

Our invention relates to improvements in machines for wrapping small articles, such as sticks of chewing gum, confections, or the like, individually in strips of paper, or other suitable wrapping material; and our object is to provide a machine, of generally improved construction for the purpose, which shall be automatic in its operation, whereby the articles to be covered are fed into the machine, enveloped in the wrapping material, assembled in desired numbers, and discharged from the machine in packets, and the wrapping operation performed with great rapidity and accuracy in the stages of the progress of the article through the machine.

The machine illustrated in the drawings is more especially designed for wrapping sticks or bars of chewing gum, the sticks or bars being of thin flat-sided, rectangular, oblong form. The sticks are placed in a reservoir and fed to the machine by gravity. The wrapping material employed consists of oblong, rectangular strips of paper, or the like, stacked upon a vertically movable support and extending in a position at right-angles to that which the strips are caused to assume in their progress through the machine. In the first stage of the operation a stick of gum is discharged from the reservoir onto a platform, and the topmost strip of paper is turned from the stack to a position at right-angles to the other strips in the stack. In the next stage the paper is fed to the first folding mechanism and the stick of gum is picked up from the platform and placed upon the center of the paper, (as illustrated in Figure 83 of the drawings.) The part of the initial folding mechanism upon which the paper and gum are thus deposited descends to a lower plane and a folding bar oscillates over the edge of the gum, making the first side-fold of the paper. (See Fig. 84.) In the next stage the gum and paper are engaged by feed mechanism and passed beneath a second folding bar or plate which makes the second side-fold of the paper. (See Fig. 85.) In the next stage the stick of gum with the paper folded over it, from opposite sides, is passed beneath end folding mechanism which bends down the ends of the paper. (See Fig. 86.) In the further progress of the article the ends of the paper are folded against the under side of the stick, whereby the wrapper fits closely over the gum (see Fig. 87); and in the last stage the wrapped gum or package is fed into an assembler. The assembler which we employ is capable of holding five wrapped sticks of gum, and when it is filled the five pieces are ejected bodily, after which they may be fastened together in any suitable manner, as by passing a rubber band around them. The packet thus formed consists of the desired number of individually wrapped gum-sticks put up in the manner usual in the trade.

It may be stated incidentally that in the progress of every fifth wrapped stick of gum from the folding mechanism to the assembler it is turned upside down, (see Fig. 88) whereby, while the end-folds of four of the sticks of a packet are on the under side of each stick, the fifth is upon the upper side, (as shown in Fig. 89.) Thus when the packet of five is made no end-fold will appear at the outer side of the packet.

Figure 5:
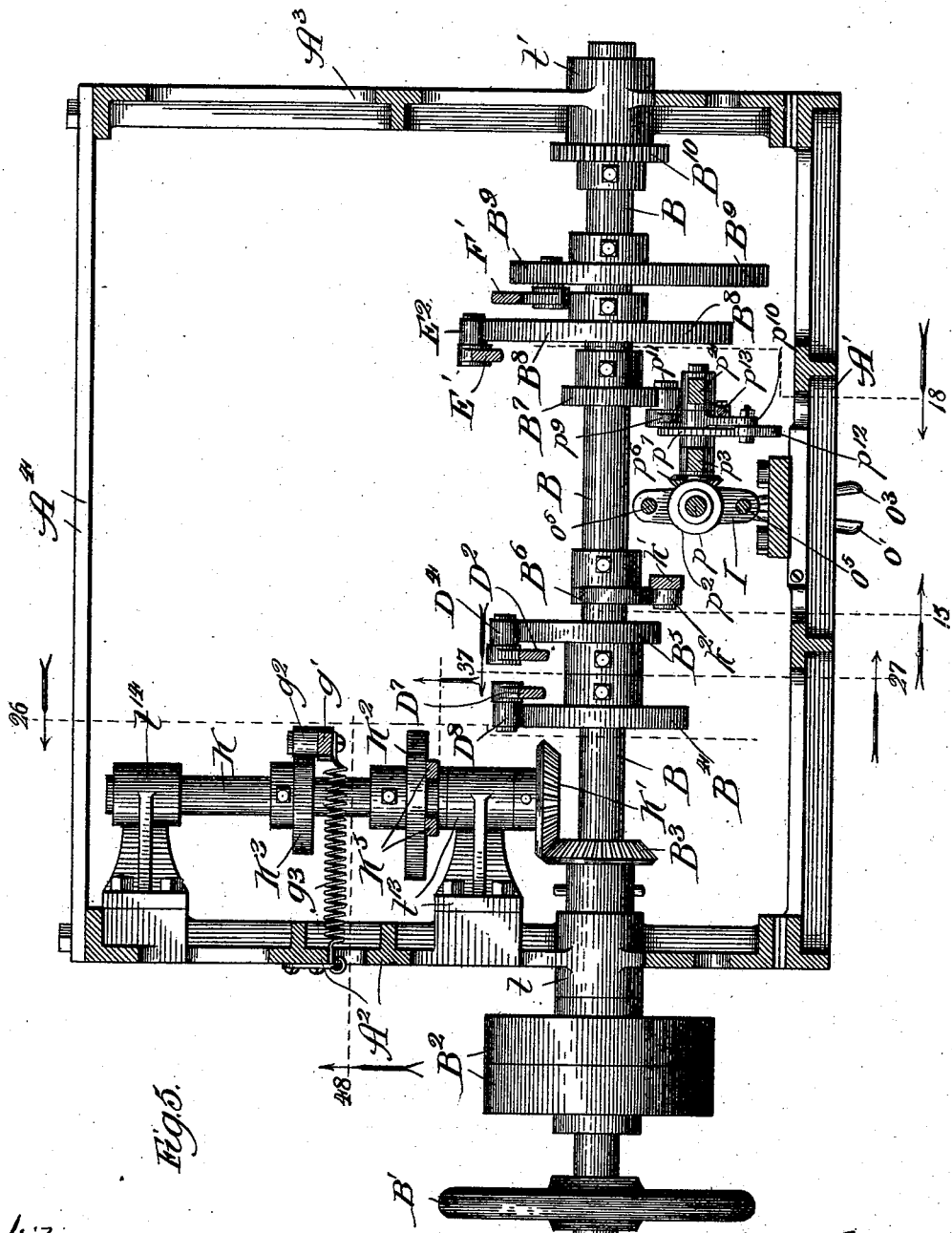

In the drawings—Fig. 1 is a front elevation of our improved machine; Fig. 2, an enlarged top plan view; Fig. 3, an enlarged section on line 3 of Fig. 1, and viewed in the direction of the arrow; Fig. 4, an enlarged section on line 4 of Fig. 3; Fig. 5, an enlarged section taken on line 5 of Fig. 1; Fig. 6, an enlarged broken section taken on line 6 of Fig. 2, and showing the paper turning mechanism; Figs. 7, 8 and 9, sections taken, respectively, on lines 7, 8 and 9 of Fig. 6; Fig. 10, a broken section on line 10 of Fig. 8; Fig. 11, a diagrammatic view of an annular cam, forming part of the mechanism of Fig. 9, and illustrating it extended in a straight line, or spread out, to convey a correct idea of the cam-surfaces; Fig. 12, a broken sectional plan view of the wrapper-sheet feeding an initial 100 folding mechanism, the section being taken on line 12 of Fig. 6; Fig. 13, a broken sectional plan-view showing the lower part of the stack-raising and sheet-feeding mechanisms, the section being taken on line 13 of Fig. 15; Fig. 14, a plan view of the follower plate or platform upon which the wrapping sheets are initially stacked; Fig. 15, an enlarged broken section taken on line 15 of Fig. 5 showing the stack-raising, and sheet-turning and discharging mechanisms; Fig. 16, a section on line 16 of Fig. 15; Fig. 17, a broken section on line 17 of Fig. 13, (corresponding with line 17 of Fig. 15); Fig. 18, a broken section on line 18 of Fig. 5 showing details of the stack raising and sheet feeding mechanisms; Fig, 19, a section on line 19 of Fig. 18; Fig. 20, a section on line 20 of Fig. 19; Fig. 21, a section on line 21 of Fig. 20; Fig. 22, a broken sectional view showing a modified detail of the upper portion of Fig. 20, to take the place of the mechanism shown in Fig. 21; Fig. 23, an enlarged, broken sectional view on line 23 of Fig. 1; Fig. 24, a detail of shaft-rocking mechanism, the view being taken on section line 24 of Fig. 1; Fig. 25, a broken-section on line 25 of Fig. 23; Fig. 26, an enlarged broken section taken on line 26 of Fig. 1, (corresponding with line 26 of Fig. 5;) Fig. 27, an enlarged broken section taken on line 27 of Fig. 2, (corresponding with line 27 of Fig. 5) and showing the mechanism for feeding a stick of gum from the reservoir, the mechanism being in its initial position; Fig. 28, a view of the same parts as Fig. 27, but showing the gum-feeding mechanism in its final position; Fig. 29, a plan view of the gum-feeding mechanism in the position shown in Fig. 27; Fig. 30, a plan view of the same mechanism in the position shown in Fig. 28; Fig. 31, a broken section on line 31 of Fig. 28; Fig. 32, an enlarged section on line 32 of Fig. 2, showing in detail the mechanism for transferring the gum from the platform at the reservoir to the paper at the folding mechanism, the mechanism being in its initial position; Figs. 33 and 34, sections (the latter being enlarged) taken on lines 33 and 34, respectively, of Fig. 32; Fig. 35, a section on line 35 of Fig. 36, being a view of the same parts as Fig. 32, but showing the gum transferring mechanism in its final position; Fig. 36, a top plan view of parts shown below the table in Fig. 35, the table which is part of the main frame of the machine being indicated by dotted lines; Fig. 37, an enlarged broken section taken on line 37 of Fig. 5, (corresponding with line 37 of Fig. 38) and showing the mechanism which operates the initial folding bar; Fig. 38, a broken section on line 38 of Fig. 37; Figs. 39, 40 and 41, broken sections taken on line 39 of Fig. 36 and showing the three stages of operation of the mechanism which produces the initial fold of the wrapping-paper; Fig. 42, an enlarged broken section taken on line 42 of Fig. 2 and showing the mechanism for bending down the ends of the wrapper; Fig. 43, the same end folding mechanism in the final stage of its operation; Fig. 44, a broken section on line 44 of Fig. 42; Fig. 45, a detail of the mechanism shown in Fig. 44; Fig. 46, a section on line 46 of Fig. 42 and showing the forward portions of the mechanism which feeds the stick of gum and its wrapper, by successive engagements therewith, beneath the plate which produces the second side-fold, thence through the end-folding mechanism, and thence through stick-reversing mechanism and guides to the assembler; Fig. 47, a top-plan view of a sliding block detail of the mechanism shown in Fig. 46; Fig. 48, an enlarged broken section taken on line 48 of Fig. 2 (corresponding with line 48 in Figs. 5 and 26), and showing the mechanism for folding the ends of the paper against the under side of the gum stick; Fig. 49, a broken section on line 49 of Fig. 48; Figs. 50 and 51, details of the mechanisms shown in Fig. 48, in their initial and final positions respectively; Fig. 52, a broken top-plan view of the table or platform, forming part of the main frame, showing its openings and recesses for receiving the various attaching screws and mechanisms illustrated in the plan view, Fig. 2; Fig. 53, a side view of a longitudinally reciprocating and rising and falling feeder (the forward part of which is shown in Fig. 46) which carries the gum stick and its wrapper from the initial folding mechanism through the other folding mechanisms and to the discharge end or assembler of the machine; Fig. 54, a top-plan view of the mechanism shown in Fig. 53; Fig. 55, a section on line 55 of Fig. 54, showing the mechanism in its raised backward position; Fig. 56, the same mechanism in its lowered backward position; Fig. 57, an enlarged broken section taken on line 57 of Fig. 2 and showing the mechanism for upsetting a wrapped-stick of gum; Figs. 58 and 59, enlarged perspective views of details of the mechanism shown in Fig. 57; Figs. 60 and 61, sections taken, respectively, on lines 60 and 61 of Fig. 57; Figs. 62, 63 and 64, details of the mechanism shown in Fig. 57; Fig. 65, a broken section on line 65 of Fig. 2; Fig. 66, a broken view in elevation of the discharge end portion of the machine showing the assembler in one position; Fig. 67, a view showing the same details as at the upper part of Fig. 66 with the assembler in another position; Figs. 68, 69 and 70, sections taken on line 68 of Fig. 66 showing moving parts in different positions; Fig. 71, a sectional view of a detail, the section being taken on line 71 of Fig. 66; Figs. 72 and 73, details of the construction shown in Fig. 66; Figs. 74, 75 and 76, sections taken on line 74 of Fig. 66 showing the same mechanism in three different positions; Fig. 77, a plan view of certain details at the discharge end of the machine; Fig. 78, a plan view of the raising and lowering assembler; Fig. 79, an enlarged section taken on line 79 of Fig. 66; Figs. 80 and 81, detail views of pawl mechanisms shown in Fig. 79; Fig. 82, a section taken on line 82 of Fig. 79; Figs. 83, 84, 85, 86 and 87, views showing the respective stages in the operation of wrapping a stick of gum in a sheet of paper; Fig. 88, a wrapped stick upset; and Fig. 89, five wrapped sticks together forming a packet.

A is the main frame of the machine, A' being the front side, A² the left-hand side, A³ the right-hand side, and A⁴ the rear side.

B is the drive-shaft, extending horizontally across the machine and journaled in bearings $t\ t'$ in the side-frames A² A³ respectively.

On the drive-shaft B is a hand-wheel B', fast and loose pulleys B², and (see Fig. 5) a miter-gear B³, cams B⁴ B⁵ B⁶ B⁷ B⁸ and B⁹ and gear-wheel B¹⁰, all of the relative sizes, and in the relative positions as to direction of extent and location shown.

C is a top-plate or table fastened by means of screws or bolts $z$ upon the front and side-frames. See Fig. 2. The table C is provided with various openings and recesses to receive moving parts, all as hereinafter explained.

Extending parallel with the drive-shaft B are four rock-shafts D E F and G, respectively, all journaled at opposite ends in bearings $t^2$ on and integral with the side-frames A² A³, respectively.

Mounted upon standards $s$ fastened in the openings $r^{29}$ in the table C is a platform H, the platform being fastened upon the tops of the standards by means of screws $s'$. See Figs. 1, 2, and 27 to 30.

H' is a gum reservoir adapted to receive sticks of chewing gum Z of the form shown most plainly in Fig. 83, the sticks of gum being stacked in the reservoir to lie flatwise upon each other, as indicated in Fig. 1. The reservoir H' has a slot or opening in its front-side, whereby an operator at the front of the machine may see at all times the quantity of gum in the reservoir. The reservoir is fastened at its base at opposite sides to corner pieces $s^2$, which are in turn fastened by means of screws to the platform H. See Fig. 2. The reservoir is raised above the platform H a distance slightly exceeding the thickness of a stick of gum Z, so that one, but not more than one, stick can pass out at a time between the lower end of the reservoir and platform. Extending from near the front of the platform in the direction of the back of the latter is an elongated slot $s^3$ (see Figs. 2, 27 to 30) and upon the platform is a movable ejector-plate H².

Loose upon the rock-shaft D, (see Figs. 3, 27, 28) is a sleeve D', having a downward-extending arm D², and an upward-extending arm D³. The downward-extending arm D² carries at its lower end a laterally-extending antifriction wheel D⁴, which rides upon the cam B⁵ of the drive-shaft; and the said arm is held in engagement with the cam by a spring D⁵ which connects at opposite ends, respectively, with the said arm and with the front side A' of the machine. The ejector-plate H² is fastened upon a block H³ which extends through the slot $s^3$ and is provided on the under side of the platform with shoulders (see Fig. 31), which tend to hold the ejector-plate to the surface of the platform. The arm D³ extends through a slot $r$ in the table C; and a link D⁶ is pivotally connected at one end with the upper end of the arm D³, and at its opposite end with the sliding block H³. In the rotation of the drive-shaft B, the lever consisting of the sleeve D' and its lower and upper arms D² D³, described, is rocked on the shaft D in the backward direction by the cam B⁵, and in the forward direction by the spring D⁵, to move the ejector-plate between the forward position, indicated in Figs. 27 and 29, and the backward position, shown in Figs. 28 and 30. In moving backward the ejector-plate passes between the reservoir H' and platform H and ejects the lowermost stick of gum, sliding the latter along the platform to adjustable stops $s^4$. On the platform (see Figs. 2, 29, and 30) to one side of the path of the ejector-plate is an adjustable guide piece $s^5$, which guides the end of the stick Z to the desired position at the stops $s^4$.

On the rock-shaft E is a downward extending arm E' which is rigidly secured to the shaft, and at its lower end carries an antifriction wheel E², which rides upon the cam B⁸. (See Figs. 3, 4, 5, 32, and 35.) Also upon the rock-shaft E adjacent to the side A² of the machine is a short downward extending arm E³ (see Figs. 3 and 26) from which extends a spring E⁴ fastened at its opposite end to a bracket $t^3$ on the front side of the machine. (See Figs. 1 and 26.) The spring E⁴ tends to turn the shaft E in one direction, and thus holds the wheel E² on the arm E' in engagement with the cam B⁸. (See Fig. 4.)

Fastened upon the center of the shaft E is a short arm E⁵ pivotally connected at its free end to the lower end of a rod E⁶. (See Figs. 15, 32, and 35.) Screwed upon the upper end of the rod E⁶ is a squared plunger-block E⁷, movable in a guide E⁸ (see Fig. 36) secured against the under side of the table C. Above the guide E⁸ is an opening $r'$ through the table, of the relative size and shape, and in the relative positions shown in Fig. 52. Rigidly fastened upon the upper end of the plunger-block E⁷ is a plunger-plate or head E⁹, which forms one feature of the initial folding mechanism hereinafter explained.

Rigidly secured to the front A' of the machine is a backward extending shelf A⁵ of the form shown in Figs. 13 and 15; and above the shelf the table is provided with a recess or opening C'. Rising from the shelf A⁵ through the recess C' to a plane parallel with the upper surface of the table C are rods $q\ q$ near the front end of the shelf, $q'\ q'$ near the rear end of the shelf, and $q^2\ q^2$, adjacent to the rods $q$, all the rods being rigidly secured at their lower ends to the shelf and vertical, and located in the relative positions shown in Figs. 12 and 13.

Extending backward from the center and lower part of the front A' of the machine is a bracket $A^6$ (see Fig. 15) fastened in place by means of screws $t^4$. (See Fig. 1.) The bracket $A^6$ at its free end affords a socket-bearing for the lower end of a vertical screw $p$, which has a bearing at its upper end in an opening $p'$ in the shelf $A^5$. At its upper end just below the shelf $A^5$ the screw $p$ carries a beveled-pinion $p^2$. Journaled in bearings $p^3$ $p^4$ (see Fig. 19) on the under side of the shelf $A^5$ is a short shaft $p^5$ carrying at one end a beveled-pinion $p^6$ engaging the beveled-pinion $p^2$. Rigidly secured to the shaft $p^5$ is a ratchet-wheel $p^7$. Adjacent to the ratchet-wheel is a bell-crank lever comprising a sleeve $p^8$ and arms $p^9 p^{10}$. The bell-crank lever is fulcrumed upon the shaft $p^5$ and the arm $p^9$ carries an anti-friction wheel $p^{11}$, which rides upon the cam $B^7$ on the drive-shaft B. Pivoted upon the free end portion of the arm $p^{10}$ of the bell-crank lever is a pawl $p^{12}$ engaging the ratchet $p^7$, all as most clearly shown in Figs. 18 and 20. Pivotally connected at its lower end to the arm $p^{10}$ of the bell-crank lever is a vertically reciprocal rod $p^{13}$, which extends through an opening $q^3$ in the shelf, and through an opening $r^2$ in the table C. On the rod $p^{13}$ is a collar $p^{14}$; and confined between the said collar and under surface of the table C is a spring $p^{15}$. The spring $p^{15}$ tends to force the rod $p^{13}$ downward and turn the bell-crank lever in the direction to cause the anti-friction wheel $p^{11}$ to bear normally against the cam $B^7$. In the rotation of the drive-shaft the cam $B^7$ swings the bell-crank lever on its fulcrum, and causes the pawl $p^{12}$ to engage the ratchet $p^7$, and turn the shaft $p^5$ part of a revolution. The rotation of the shaft $p^5$ also produces rotation of the screw $p$ through the medium of the beveled-gears $p^6 p^2$. On the screw $p$ is a spring-jaw nut I (see Figs. 1, 15 and 16), comprising a stationary jaw $o$ having a handle $o'$, and an opening and closing jaw $o^2$ having a handle $o^3$; a spring $o^4$ being confined between the handles to hold the jaws normally closed and in engagement with the threads of the screw $p$. Secured at their lower ends to the stationary jaw $o$ of the nut I are two vertical rods $o^5 o^5$ which extend loosely through guide-openings $q^4$ in the shelf $A^5$. Fastened upon the upper ends of the rods $o^5$ is a stack-elevating or paper-feed plate I' of the form shown in Fig. 14. In its edges the plate I' has recesses $o^6$ on opposite sides to receive the rods $q^2$, and recesses $o^7$ to receive the rods $q$. Thus in the up and down movement of the spring-jaw nut the plate I' is carried up and down and guided by the rods $q q^2$.

The wrappers for the sticks of gum Z consist of rectangular, oblong sheets of paper Y, most clearly shown in Fig. 83. The sheets Y are stacked upon the feed-plate I', as shown in Figs. 1 and 15, and the stack is held between the guide rods $q q' q^2$, as shown in Fig. 12.

Pivotally connected at its lower end in a recess $q^5$ in the shelf is an upward-extending rod $q^6$ held normally vertical against the forward edge of the plate I' by a spring $q^7$ which is fastened upon the front A' of the machine. See Figs. 1 and 15.

By grasping the handles $o' o^3$ of the spring-jaw nut, and squeezing them against the resistance of the spring $o^4$, the operator may disengage the nut from the threads of the screw and raise it or lower it with the rods $o^5$ and feed-plate I'.

In operation, as hereinafter explained, the topmost sheet Y of the stack should always be in a plane slightly above the plane of the top of the guide-rod $q$, shown in Fig. 15, whereby when turned the topmost sheet will pass over the upper end of that rod and the rods $q' q^2$; and the object of the feed-mechanism is to raise the stack with each operation a distance equal to the thickness of one of the sheets of paper. In each partial rotation of the screw $p$, produced by each complete revolution of the drive-shaft, the spring-jaw nut is raised. On the upper end of the rod $p^{13}$ is a feed-regulator arm $p^{16}$, which in the descent of the rod $p^{13}$, impinges against the topmost sheet of paper, as indicated in Fig. 21. The engagement of the arm $p^{16}$ with the stack limits the descent of the rod $p^{13}$ under the action of the spring $p^{15}$, and consequently the movement of the pawl $p^{12}$ along the ratchet and the approach of the anti-friction wheel $p^{11}$ toward the cam $B^7$. Thus if the stack of paper is high the descent of the rod $p^{13}$ and approach of the anti-friction wheel $p^{11}$ to the cam are limited, so that the degree of movement of the bell-crank lever under the action of the cam will be accordingly limited; and as the degree of turning of the screw $p$, and consequent rise of the feed-plate I', depend upon the degree of movement given by the cam $B^7$ to the bell-crank lever, the arm $p^{16}$ in its engagement with the stack regulates the rise or feed of the stack.

In practice there are apt to be slight variations in thickness between the sheets of paper employed, and for that reason some means, as described, are desirable to regulate the feed. Where there are no variations in thicknesss of the paper, the arm $p^{16}$ may be dispensed with and, as shown in the modified construction, Fig. 22, a collar $p^{17}$ provided to impinge against the top of the table C when it descends. The collar $p^{17}$ is made adjustable so that it may be arranged to limit the descent of the rod $p^{13}$ according to the thickness of the paper employed.

In the first operations of the machine the topmost sheet of paper must be turned to a position at right-angles to the stack and moved to extend over or rest upon the plunger-plate $E^9$ of the initial folding-mechanism.

The mechanism which turns the topmost sheet to a position at right-angles with relation to the stack will be next described.

Journaled in bearings $t^{30}$ on the side $A^3$ of the machine, see Fig. 1, are three short shafts $n$ carrying a vertical train of three pinions $n'$. See Fig. 23. The lowermost pinion $n'$ engages the pinion $B^{10}$ on the drive-shaft B, and the uppermost pinion $n'$ engages a pinion $n^2$ on a horizontal shaft $n^3$, which is journaled near its outer end in a bearing $t^5$ on the side frame $A^3$, and passes near its inner end through a bearing afforded by a hanger $t^6$ extending downward from the under side of the table C, and fastened in place by means of bolts $t^7$. See Figs. 1, 2 and 6. On the inner end of the shaft $n^3$ is a beveled-pinion $n^4$. Fastened upon the table C and extending downward through an opening $r^3$ therein is a stationary bearing-sleeve $t^8$ provided with an arm $t^9$. The bearing-sleeve $t^8$ is fastened in position with screws which pass through the openings $r^4$ in the table C. Journaled in the sleeve $t^8$ is a vertical shaft $n^5$ provided above the sleeve with a cam $n^6$, and at its upper end with a crank-arm $n^7$. Below the bearing-sleeve the shaft $n^5$ carries a beveled-pinion $n^8$ engaging the beveled-pinion $n^4$. Fastened upon the table at the screw-openings $r^{30}$, see Fig. 52, is a bracket $m$ provided with bearings $m'$ $m^2$ $m^3$ for a vertical rod $m^4$. At its lower end the rod $m^4$ is provided with a cup $m^5$ to receive a block $m^6$ of rubber, or other friction material. On the bearing $m'$ is a stirrup $m^7$ having a bearing-opening in its top for the rod $m^4$; and on the rod above the bearing $m'$ is a collar $m^8$, between which and the stirrup is a confined spring $m^9$ which operates normally to press the rod $m^4$ in the downward direction. Between the bearings $m'$ $m^2$ the rod $m^4$ is provided with a crank-arm $m^{10}$ which is connected by means of a link $n^9$ with the crank-arm $n^7$ on the shaft $n^5$. The crank $m^{10}$ is loose upon the rod, and is provided on the inner side of its sleeve-portion with a feather which enters and engages a vertical groove $m^{11}$ in the rod. Thus the rod can rise and fall in its bearings and will be turned on its axis by movement of the crank-arm $m^{10}$. Below the bearing $m^2$ the rod $m^4$ carries a collar $m^{12}$, provided part way around its circumference with a segmental tongue $m^{13}$. Pivoted between its ends on the arm $t^9$ of the sleeve-bearing $t^8$ is a lever $n^{10}$ provided at one end with a laterally-extending pin $n^{11}$, which rides against the cam $n^6$, and at its other end with a groove-piece $n^{12}$, which engages the tongue $m^{13}$ of the collar $m^{12}$. The rod $m^4$ is centrally above the paper-stack upon the feed-plate $I'$. In the rotation of the drive-shaft B the pinion $B^{10}$ turns the train of pinions $n'$, and through the latter, the pinion $n^2$ and shaft $n^3$, causing the shaft $n^5$ to be rotated through the medium of the beveled-gears $n^4$ $n^8$. In the rotation of the shaft $n^5$ and cam $n^6$ the rod $m^4$ is raised by the lever $n^{10}$, which is operated by the cam $n^6$, and plunged downward by the spring $m^9$. Also in the rotation of the shaft $n^5$ and its crank-arm $n^7$ the link $n^9$ is plunged back and forth to turn the rod $m^4$ on its axis. Thus in operation the rod $m^4$ is plunged downward until the friction-piece $m^6$ bears against the topmost sheet of the stack. The rod is then turned by the link $n^9$ a quarter revolution. The rod is then lifted again by the lever $n^{10}$ and then turned backward a quarter revolution by the link $n^9$. The turning of the rod $m^4$ while its friction-piece $m^6$ engages the topmost sheet of paper, causes that sheet to be turned a quarter revolution, or to a position at right-angles to the rest of the stack.

Pivoted toward one end upon a rod or standard $t^{10}$ (see Fig. 1, the standard being fastened at the opening $r^{31}$ in the table C), is a rod or finger $l$ having a downwardly-bent and pointed end-portion $l'$. On the finger $l$ is a weight $l^2$. In operation the pointed end of the pivotal-finger $l$ bears upon the topmost sheet Y of the stack and offers slight resistance to the turning of said sheet. It engages the sheet close to the edge of the latter, and in the initial turning of the sheet, the sheet is drawn from beneath the point of the finger, and the latter engages the next lower sheet. This engagement of the pointed-finger with the sheet next below the top one prevents the second sheet from being turned by the frictional engagement with it of the top sheet. Thus in the movement of the sheet-turning mechanism only one sheet will be turned at a time.

Journaled in the shelf $A^5$, as shown most plainly in Fig. 13, is a horizontal rock-shaft $k$, provided near one end with a downward-extending arm, $k'$ see Fig. 17, which carries at its lower end an anti-friction wheel $k^2$, engaging the cam $B^6$ on the drive-shaft B. A spring $k^3$ (see Figs. 1 and 13) extending from the arm $k'$ to the front $A'$ of the machine, tends to hold the friction-wheel $k^2$ against the cam $B^6$. Extending upward from the shaft $k$ are sheet-transferring rods $k^4$, which are fastened at their lower ends to the shaft near opposite ends of the latter, and extend upward in planes just beyond the planes of the guide-rods $q$ $q^2$. The rods $k^4$ project above the top of the stack, and in the rotation of the drive-shaft, the cam $B^6$ turns the arm $k'$ and shaft $k$, to swing the rods $k^4$ at their upper ends from the forward position, where they extend in recesses $r^4$ $r^{32}$ of the table C, to a backward position where they extend in recesses $r^5$ of the table. While the sheet of paper is being turned as described, the rods $k^4$ are in the forward position, and when the sheet has been turned, the rods $k^4$ move to the backward position, as described, and in doing so engage the ends of the topmost sheet which project beyond opposite sides of the stack, as indicated by dotted lines in Fig. 12, and slide the sheet backward to a position where the latter extends centrally over the plunger-plate $E^9$ of the initial folding-mechanism. Fastened at their forward ends to posts or standards $t^{31}$ on the table C (secured in place at the openings $r^{33}$, Fig. 52) are approximately parallel, horizontal backward-extending guide-rods $k^5$, shown by full and dotted lines in Fig. 12, and also in Figs. 2 and 15. The rods $k^5$ hold the sheet down as it is being slid in the backward direction and insure its continued engagement by the rods $k^4$. On the vertical guide-rods $q^2$ are backward-extending guide-pieces $k^6$ below the path of the sheet, which operate to guide the latter upward over the initial folding-mechanism, to rest upon the plunger-plate $E^9$.

In the next step the stick of chewing gum Z is transferred from the platform H to the sheet of paper at the initial folding-mechanism. Fastened upon the table C at the bolt-holes $r^6$ is a standard $t^{11}$, see Figs. 2, 32, 35 and 52, and fastened upon the table C at the bolt-holes $r^7$ is a standard $t^{12}$. The standard $t^{11}$ at its upper end constitutes the bearing for a short horizontal shaft $i$, and loosely mounted upon the said shaft is a bell-crank lever $i'$ having arms $i^2$ and $i^3$. Fastened upon and extending inward from the side $A^2$ of the machine, are two bearing-projections $t^{13}$ and $t^{14}$, respectively, in the plane of the bearing $t$, and shown most clearly in Figs. 5 and 26. Journaled toward opposite ends in the projections $t^{13}$ $t^{14}$ is a horizontal shaft K, which extends at right-angles to the drive-shaft B, and is provided at its forward end with a beveled gear-wheel $K'$, engaging the beveled-gear $B^3$ on the drive-shaft. On the shaft K are two cams $K^2$ and $K^3$, respectively, and in the relative positions shown.

$K^4$ is a vertically reciprocating-rod, see Figs. 1, 26, 32 and 35, formed at its lower end-portion with a yoke $K^5$, which loosely embraces the shaft K, and carries at its lower end a laterally-extending anti-friction wheel $K^6$, which rides upon the cam $K^2$. Connecting the bar $K^4$ at the yoke $K^5$ with the under side of the table C is a spring $K^7$, which tends to draw the rod in the upward direction and hold the anti-friction wheel $K^6$ up against the cam $K^2$. The rod $K^4$ passes through the elongated opening $r^{34}$ in the table, and at its upper end it is pivotally connected to the arm $i^2$ of the bell-crank lever $i'$. The standard $t^{12}$ constitutes the bearing of a short shaft $i^4$, upon which is fulcrumed a bell-crank lever $i^5$, having arms $i^6$ and $i^7$. The bell-crank lever $i^5$ is the exact counterpart of the bell-crank lever $i'$. Extending between the bell-crank levers, and pivotally connected at opposite ends respectively, with the ends of the arms $i^2$ $i^6$, is a tie-rod $i^8$, bent, as shown, to clear other parts of the machine in its movement.

$K^8$ is a carrier frame or bar pivotally connected at its ends with the free ends of the arms $i^3$ $i^7$, respectively, of the bell-crank levers. Formed integral with the frame or bar $K^8$ is a bearing-sleeve $K^9$. Adjustably fastened in the sleeve $K^9$ is a downward-extending bar $K^{10}$, provided at its lower end with a head or cross-plate $K^{11}$. Near opposite ends of the plate $K^{11}$ are one or more threaded openings to receive one or more pointed gum-engaging screws affording spear points $K^{12}$. In the rotation of the drive-shaft, and consequent turning of the shaft K, the cam $K^2$ plunges the rod $K^4$ downward, and the spring $K^7$ plunges it upward, causing the bell-crank lever $i'$, and the bell-crank lever $i^5$, to be rocked coincidently upon their bearings. Connected at one end with the bell-crank lever $i^5$, and at its opposite end with a fastening-piece $t^{16}$ on the edge of the table, is a spring $K^{13}$. The spring $K^{13}$ supplements the action of the spring $K^7$, to resist movement of the gum-transferring mechanism to the platform H, and to move the said mechanism to the initial folding-mechanism.

In the rocking of the bell-crank levers the gum-transferring mechanism, comprising the bar $K^8$ and attendant parts, is moved between the positions shown in Figs. 32 and 35. In the first position the points $K^{12}$ are pressed into the stick of gum Z at the platform H to pick up the stick; and in the second position the gum is placed by the transfer-mechanism upon the sheet of paper Y, which is imposed, as before described, upon the plunger plate $E^9$ of the initial folding-mechanism.

Extending backward from the recess $C'$, and crossing the opening $r'$ in the table C, are parallel grooves $r^8$, and between the said grooves is an opening $r^9$ through the table in the relative position shown in Fig. 52.

L is a raised guide-plate, see Figs. 2, 32, 35 and 40, for example, fastened in place by screws which enter threaded-openings $r^{10}$ in the table C. See Fig. 52. The plate L is raised, as stated, to afford a horizontal guide-passage $L'$, between it and the upper surface of the table. The plunger-plate $E^9$ is provided with grooves $E^{10}$ in line with the grooves $r^8$. On opposite sides of the openings $r'$, in the relative positions most plainly indicated in Fig. 52, are openings $r^{11}$ through the table C. Firmly secured to the rock-shaft D, and extending in the downward direction therefrom, is an arm $D^7$. See Figs. 1, 3, 5, 26, 37 and 38. At its lower end the arm $D^7$ carries an anti-friction wheel $D^8$, which rides upon the cam $B^4$ of the drive-shaft B, as most plainly indicated by dotted lines in Fig. 26 and by full lines in Fig. 37. On the drive-shaft D, adjacent to the side $A^2$, is a downward-extending arm $D^9$, and extending between the arm $D^9$ and the front $A'$ of the machine, is a spring $D^{10}$, which tends to hold the anti-friction wheel $D^8$ against the cam $B^4$. Rigidly secured to the rock-shaft D are two upward-extending arms $D^{11}$, in the relative positions shown for example in Figs. 3 and 38. Beyond opposite ends of the openings $r^{11}$ are short hanger pieces $t^{15}$, see for example Figs. 35, 36 and 37, secured to the under side of the table C at the screw-holes $r^{12}$ (Fig. 52). Passing through the hangers $t^{15}$ are horizontal guide-rods $D^{12}$, which extend centrally below and across the openings $r^{11}$. The guide-rods $D^{12}$ pass through and are fastened in openings in sliding blocks $D^{13}$, which latter are pivotally secured to the upper ends of the arms $D^{11}$. See Figs. 37 and 38. The sliding-blocks $D^{13}$ extend upward through the openings $r^{11}$, and to a plane parallel with the under surface of the plate L. Fastened at opposite ends upon the upper ends of the sliding-blocks $D^{13}$ is the initial folding-plate or bar $D^{14}$, which thus extends in the plane of the plate L, as shown for example in Fig. 40. In the rotation of the drive-shaft B the shaft D is rocked by the engagement of the cam $B^4$ with the wheel on the arm $D^7$, and the upward-extending arms $D^{11}$ are rocked to slide the blocks $D^{13}$ back and forth with the rods $D^{12}$ and in the openings $r^{11}$, to move the initial folding-plate $D^{14}$ between the position at one side of the plunger-plate $E^9$, see Figs. 36, 39 and 40, to a position about half way over the said plunger-plate. See Figs. 12 and 41.

When the sheet of wrapping paper is passed to the initial folding-mechanism, as hitherto described, the folding-plate $D^{14}$ is in the forward position, shown, for example, in Figs. 15, 39 and 40; and the plunger-plate $E^9$ is in the raised position shown, for example, in Fig. 39, whereby its upper surface is parallel with the upper surface of the plate $D^{14}$. The paper is guided over the plate $D^{14}$ by the guides $k^6$, as before explained, and is positioned over the plunger-plate against stops $L^2$ on the plate L by means of slanting guide-projections $L^3$, also upon the plate L. In other words, as the sheet is pushed backward by means of the swinging arms $k^4$, it is guided by the guides $k^6$ over the plate $D^{14}$, and is caused by the slanting guide-projections $L^3$ to extend in the proper position at the stops $L^2$. The gum-transferring mechanism is operated to take up the stick of gum, as before described, from the platform H, and carry it to the plunger-plate $E^9$, and place it upon the center of the wrapping paper at the moment the said sheet has been placed in position as described. The stick of gum strikes the paper a little in advance of the final downward movement of the transferring-mechanism, and at the instant that the stick of gum strikes the paper the plunger-plate $E^9$ descends, followed by the gum-transferring mechanism, which still holds the stick of gum. The parts descend until the upper surface of the plunger-plate is in a plane parallel with the table top, as indicated for example in Fig. 35. In the descent of the plunger-plate and gum-transferring mechanism the stick of gum Z, which is a trifle less in width than the plunger-plate and the distance between the plates $D^{14}$ and L, is pressed downward and the opposite edge portions of the sheet Y bent upward, as indicated in Fig. 40. The gum-transferring mechanism remains momentarily stationary before starting again in the direction of the platform H, and while the gum is still engaged by the transferring-mechanism the initial folding-plate $D^{14}$ is moved to its backward position, as shown in Fig. 41, to fold one edge portion of the paper Y over the stick Z, as shown. While the initial folding-plate $D^{14}$ is still in the backward position, the gum-transferring mechanism commences to rise and disengages the points $K^{12}$ from the gum-stick.

Resting in the bases of the longitudinal slots $r^8$ are reciprocal feed-bars M, each consisting of a lower bar-member M' and an upper bar-member $M^2$. The feed-bars are shown in detail in Figs. 53, 54, 55 and 56. The lower-members M' each consist of a flat strip provided in the relative positions shown with wedge-lugs $h$ presenting the inclined-surfaces $h'$, and at their rear ends the members M' are turned up, as indicated, to afford stops $h^2$ provided with sockets $h^3$. The upper-members $M^2$ are provided on their under surfaces with sockets $h^4$ having inclined-faces $h^5$. The upper-member is as much shorter than the lower-member as the length of the inclined-faces $h'$ $h^5$. When placed together the sockets $h^4$ of the upper-members fit over the wedge-lugs $h$ of the lower-members, as indicated in Fig. 56, and the rear end of each upper-member is at a distance from the upturned ends of the lower-member equal to the length of the inclined-surfaces. On the upper-members $M^2$ are pins or stops $h^6$ $h^7$ $h^8$ and $h^9$, equi-distant apart, as indicated. On the rear end-portions of the upper-members $M^2$ are bent-pins or stops $h^{10}$, which project beyond the ends of the upper-members as shown. On the inner sides of the upper-members are downward-extending ears $h^{11}$ having openings through them, to receive the opposite ends of a connecting-pin $h^{12}$. On the shaft $n^3$ at the upper right-hand corner of the machine, beyond the bearings $t^5$, is a crank-arm G', and extending from the rock-shaft G in the plane of the crank-arm G' is an arm $G^2$.

$G^3$ is a link pivotally connected at opposite ends, respectively, with the inner ends of the crank G' and arm $G^2$. In the rotation of the shaft $n^3$ the crank G' is turned and plunges the link $G^3$ up and down to rock the arm $G^2$ and shaft G. Fastened upon the shaft G, in the relative positions shown, for example, in Fig. 3, is an upward-extending arm $G^4$.

On the under side of the table C at opposite sides of the opening $r^9$ are guide-pieces $t^{17}$ $t^{17}$, of the shape shown in cross section for example in Fig. 42, and held in place by screws which extend through the openings $r^{13}$ in Fig. 52. The guide-pieces form, with the under-surface of the table at opposite sides of the openings $r^9$, guide-ways $t^{18}$.

$G^5$ is a sliding-block, see Figs. 42, 43, 46, 47 and 48, movable in the horizontal plane in the opening $r^9$, and having lateral tongues $h^{13}$, which fit and slide in the guide-grooves $t^{18}$. On its lower side the block $G^5$ has a bifurcated backward-extending part $h^{14}$ into which the upper end arm $G^4$ extends, and at which the said arm and block are pivotally secured together. On its upper side the block $G^5$ carries a bifurcated projection $h^{15}$ which embraces the pin $h^{12}$, connecting the sliding bars M. In the backward movement of the shaft G, the arm $G^4$ is rocked in the backward direction, sliding the block $G^5$ in the guides $t^{18}$, and moving the bars M in the same direction. The lower-members M' of the feed-bars are held with more or less friction against movement in the grooves $r^8$, while the upper-members $M^2$ move readily. Therefore in the initial backward movement of the block $G^5$, in the direction of the position shown in Fig. 46, the upper-members $M^2$ of the bars M are moved to the stops $h^2$ of the lower-members, as shown in Fig. 55, causing the surfaces $h^5$ to rise on the surfaces $h'$, and thus raise the members $M'$ to the upper plane. When the upper members have been raised as described the upper and lower members travel together to the backward position.

In the initial rocking of the shaft G, arm $G^4$ and block $G^5$ in the forward direction, the upper members $M'$ are moved backward, whereby the surfaces $h^5$ slide down the surfaces $h'$, and the sockets $h^4$ engage the wedge lugs $h$, causing the upper members $M^2$ to descend to the lower plane, after which the members travel together in the forward direction. Thus it will be understood that in the backward movement of the feed bars M, the upper members $M^2$ and their stops travel in an elevated plane; and in the forward movement of the feed bars M, the upper members $M^2$ and their stops travel in a lower plane.

When the first fold has been given to the paper as before described, and the gum-transferring mechanism is raised out of the way, the feed-bars M start in the backward direction, causing the upper-members to rise and their forward pins or stops $h^6$ to engage the partially wrapped stick and slide it in the backward direction. In the passage of the stick in the backward direction the other edge-portion of the paper is turned over upon the stick by contact with the plate L under which it slides, giving to the stick the form shown in Fig. 85. The stops or pins $h^6$ move the stick to the initial end-folding mechanism next to be described, and then the bars M start in the forward direction, whereby the upper-members $M^2$ descend and their stops or pins thereon pass forward in a plane below the stick. On opposite sides of the opening $r^9$ in the position shown in Fig. 52 are openings $r^{14}$ $r^{14}$, and beyond the said openings in line therewith are round openings $r^{15}$ $r^{15}$ through the table.

On the shaft F is a downward-extending arm $F'$, see Figs. 3, 5, 42 and 44, provided at its lower end with an anti-friction wheel $F^2$ which rides upon the cam $B^9$; also on the shaft F adjacent to the side $A^3$ of the machine is an upward-extending arm $F^3$, which is connected at its upper end by means of a spring $F^4$ with the back of the machine. (See Fig. 23.) The tendency of the spring $F^4$ is to hold the friction-wheel $F^2$ against the cam $B^9$, and in the turning of the drive-shaft and cam $B^9$, the shaft F is rocked in its bearings. On the shaft F, in the relative positions shown, for example, in Fig. 3, are short arms $F^5$ $F^5$. Fitting in the openings $r^{15}$ of the table are tubular sleeve-pieces $t^{19}$ $t^{19}$, see Figs. 42 and 44, fastened in place by means of screws passing into openings $r^{16}$ in the table. (See Fig. 52.) Extending through the sleeves $t^{19}$ are vertically reciprocal bars N N. In the ends of the arms $F^5$ are elongated openings $F^6$, see Fig. 45, and the bars N at their lower ends are pivotally connected to the arms $F^5$ at the openings $F^6$. Each bar N is provided with a pin $N'$ which passes through, the pin being allowed sufficient play in said opening, to reciprocate the rod in the vertical plane, while the arm moves in the arc of a circle. Fastened at opposite ends upon the upper ends of the bars N is a cross-bar or initial end-folder $N^2$, having two parallel downward folding-plates $N^3$ $N^3$, the inner surfaces of which are closed to the inner sides of the openings $r^{14}$. Extending parallel with each other from the openings $r^{14}$ in the backward direction are two strips $t^{20}$ $t^{20}$ fastened down by screws, as shown for example in Fig. 52, and each provided midway of its length with a vertical-stud $t^{21}$. Resting at opposite edges upon the strips $t^{20}$ is a removable guide-plate O provided at its center with a knob or handle $O'$, see Fig. 2, and with pivotal-hooks $O^2$, which, when the plate is in position, may be turned to engage the studs $t^{21}$ to fasten the plate down. The plate O extends beneath the end folding-bar $N^2$ to the plate L. When the stick is moved in the backward direction, as described, by the engagement with it of the pins or stops $h^6$, it is moved to a position directly below the initial end folding-bar $N^2$, and then released by the stops. When in this position the ends of the paper beyond the gum extend over the openings $r^{14}$ beneath the lower ends of the plates $N^3$, and when the stick arrives in the position described, the shaft F is rocked downward to plunge the bars N $N^2$ and plates $N^3$ in the downward direction, to bend the end portions of the paper, as indicated in Fig. 43. After their downward plunge the parts N $N^2$ $N^3$ are raised immediately out of engagement with the stick, and the feed-bars M having just reached the forward limit of their traverse, start again in the backward direction, causing the upper members $M^2$ to rise, as before explained, and the pins or stops $h^7$ to engage the stick, and move it again in the backward direction between the plate O and table to the second end-folding mechanism, which folds the ends of the wrapper against the under side of the stick, as shown in Fig. 87. On opposite sides of the opening $r^9$, in the positions shown for example in Fig. 52, are openings $r^{17}$ $r^{17}$ through the table; and extending from the openings $r^{17}$ in the direction toward opposite sides of the machine are openings $r^{18}$, at the sides and ends of which are shallow recesses $r^{19}$ in the upper surface of the table. See Figs. 48, 49, 50 and 51.

Secured against the under side of the table C is a hanger $t^{22}$, shown by dotted lines in Fig. 48 and by full lines in Fig. 49, and fastened in place by means of screws which engage the openings $r^{20}$. See Fig. 52. On the side-frame $A^2$ is an inward-extending bearing-arm $t^{23}$, see Figs. 26 and 48, and pivoted between its ends upon a short bearing-shaft $g$ at the end of the bearing arm $t^{23}$, is a lever $g'$. At its lower end the lever $g'$ carries a laterally-extending anti-friction wheel $g^2$, which rides upon the cam $K^3$ on the shaft K. A spring $g^3$ extends from the lower arm of the lever $g'$, to the side frame $A^2$, and operates to hold the anti-friction wheel $g^2$ to the cam $K^3$. Fulcrumed between its ends upon the lower end-portion of the hanger $t^{22}$ is a lever $g^4$; and pivotally connected at one end with the upper end of the lever $g'$, and between its ends with the lower end of the lever $g^4$, is an arm $g^5$. In the recesses $r^{19}$ are sliding folder-plates $g^6$ $g^7$, respectively, provided on their under-surfaces with lugs $g^8$, which extend through the openings $r^{18}$, as shown for example in Figs. 48, 49, and 50. The plate $g^6$ is pivotally connected at its lug $g^8$, as shown in Fig. 49, to the upper end of the lever $g^4$; and the plate $g^7$ is pivotally connected at its lug $g^8$ to the end of the arm $g^5$. The plates $g^6$ are held down in the recesses $r^{19}$ by means of cap-plates $t^{24}$, which extend over the recesses $r^{19}$, and are fastened down by means of screws which pass into the openings $r^{21}$ in the upper surface of the table. See Fig. 52. In the rotation of the shaft K the engagement of the cam $K^3$ with the anti-friction wheel $g^2$, on the lever $g'$, swings the latter, and by drawing the arm $g^5$, and through the latter, the lower end of the lever $g^4$ in the direction of the side $A^2$, plunges the plates $g^6$ $g^7$ toward each other; and when the anti-friction wheel $g^2$ is released by the cam $K^3$, the spring $g^3$ forces the lever $g'$, arm $g^5$ and lower arm of the lever $g^4$ in the opposite direction, whereby the plates $g^6$ $g^7$ are plunged in the direction away from each other. In the movement of the wrapped stick of gum under the engagement with it of the pins or stops $h^7$, as described, the stick is deposited in a position whereby the downwardly bent-ends of the wrapper are between the sliding-plates $g^6$ $g^7$, as indicated in Fig. 50. On the instant that the wrapped stick is deposited in this position the sliding folder-plates $g^6$ $g^7$ are plunged toward each other and fold the downward projecting-ends of the wrapper against the under-surface of the stick, as indicated in Fig. 51. Before the plates $g^6$ $g^7$ are moved apart, the feed-bars M having reached the forward end of their traverse again, start in the backward direction, causing the upper-member as it is raised to engage the wrapped stick with the stops or pins $h^8$, and move the stick another step in the backward direction, between the plate O and upper surface of the table, whereby the stick is deposited in the turning or upsetting-mechanism next to be described.

On opposite sides of the guide-grooves $r^8$ are openings $r^{22}$ $r^{23}$, through the table, of the same size and shape, but extending in opposite directions, as indicated most plainly in Fig. 52. Fastened on the table at the said openings are bearing-blocks $t^{25}$, which are held in place by means of screws engaging the holes $r^{24}$ in the table. (See Figs. 2 and 52.) Journaled in the bearings $t^{25}$ are shafts $f$, see Figs. 2, 57, 59 and 60, which extend longitudinally across the openings $r^{22}$ $r^{23}$ in line with each other. At their inner ends the shafts $f$ are provided with sockets $f'$, in which are fitted channel-pieces $f^2$ affording guide-sockets $f^3$. When in the normal position the grooves of the channel-pieces extend in the horizontal plane, and are in the path of the gum-stick in the progress of the latter toward the back of the machine. Under the action of the pins or stops $h^8$ of the feed-bars M, the gum-stick is passed into the sockets $f^3$, where it rests at its opposite ends. As previously stated, in the progress of the sticks of gum through the machine every fifth one is reversed, and the mechanism for turning the shafts $f$ with their channel-pieces $f^2$ will be next described.

Fastened against the under side of the table are hangers $t^{26}$ $t^{27}$, see Fig. 57, which are secured in place by means of screws passing into the screw openings $r^{25}$ in the table. See Fig. 52. Journaled at opposite ends in the hangers $t^{26}$ $t^{27}$ is a horizontal shaft $e$, which extends across the openings $r^{22}$ $r^{23}$, centrally below the shafts $f$. Near its bearings the shaft $e$ carries two pinions $e'$ $e'$, which engage smaller pinions $f^4$ on the shafts $f$. Keyed upon the shaft $e$, on the side adjacent to the hanger $t^{27}$, is a ratchet-wheel $e^2$, having five teeth, and shown in detail in Fig. 63. Loose upon the shaft $e$ is a ratchet wheel $e^3$ having four shallow notches $e^4$ between teeth, and one deep notch $e^5$. The ratchet-wheel $e^3$ is of larger circumference than the ratchet-wheel $e^2$, and the shallow notches $e^4$ extend to a depth approximating the circumferential surface of the ratchet $e^2$, while the notch $e^5$ extends to a depth approximating the depth of the notches of the ratchet-wheel $e^2$. See Fig. 61.

On the rock-shaft G is a downward and backward-extending arm $G^6$. See Figs. 3 and 60. Loosely mounted on the shaft $e$ at the side of the ratchet-wheel $e^3$ is a swinging-arm $e^6$, carrying a spring-pawl $e^7$. At its free end the arm $e^6$ is pivotally connected with the upper end of a rod $G^7$, which, at its lower end, is pivotally connected to the end of the arm $G^6$. On the hanger $t^{27}$ is a spring-dog $e^8$, shown in detail in Fig. 58, which at its free end bears against the toothed-edge of the ratchet $e^3$, to prevent backward movement of the latter. On the table C are spring-dogs $e^9$ $e^9$, which engage the gear-wheels $f^4$, as shown in Fig. 60, operating as brakes upon the latter.

In each rotation of the drive-shaft, the shaft G is rocked, as hereinbefore described, and with each rocking-movement it swings the arm $G^6$ and plunges the rod $G^7$ upward and then downward. In the upward movement of the rod $G^7$, the arm $e^6$ is swung upward, causing its pawl $e^7$ to engage a tooth of the ratchet $e^3$ and turn that ratchet wheel one-fifth of a revolution. In four such operations the pawl engages the shallow-teeth $e^4$, whereby the pawl is maintained out of contact with the ratchet-wheel $e^2$. In the fifth operation, however, the toothed-socket $e^5$ is engaged by the pawl, permitting the latter to spring into one of the sockets of the ratchets $e^2$, whereby in the movement of the arm $e^6$, the ratchet $e^2$ is turned, and turns the shaft $e$ one-fifth of a revolution. The pinions $e'$ $f^4$ are of such sizes with relation to each other that movement of the pinions $e'$ one-fifth of a revolution, turns the pinions $f^4$ and shaft $f$ one-half of a revolution, swinging the channel-pieces $f^2$ around a half circle, whereby the gum-stick held by the channel-pieces is reversed, and the grooves $f^3$ are in the horizontal plane. Extending from the openings $r^{22}$ to the rear end of the table, at opposite sides of the grooves $r^3$, are overhanging guide-pieces $t^{28}$ $t^{28}$, see Figs. 2 and 65, which are fastened down upon the table by means of screws, passing into the openings $r^{26}$ in the upper surface of the table. See Fig. 52. In the next movement of the feed-bars M, the pins or stops $h^9$ rise and engage the gum-stick and move it from the channel-pieces $f^2$ to the grooves $t^{29}$, see Fig. 65, afforded by the overhanging guide-pieces $t^{28}$. The next step is to transfer the stick of gum from the guides $t^{28}$ to an assembling receptacle, which will be next explained.

P is a hanger-frame, shown in Figs. 66, 67, 68, 69, 70 and 71, and by top plan view in Fig. 77. It is made in two parts, as indicated in Fig. 77, which are fastened together, and the whole is secured against the under side of the rear end of the table C by means of screws passing into the openings $r^{27}$. See Fig. 52. The hanger-frame carries two blocks P' P$^2$, which project above and below the upper and lower-surfaces of the table, as indicated; and the inner surfaces of the blocks P' P$^2$ present V-shaped grooves $d$ $d$. Extending downward from the blocks P' P$^2$, respectively, are hangers P$^3$ P$^4$, forming integral parts of the hanger-frame. Journaled in the hangers P$^3$ P$^4$ is a horizontal rock-shaft R. Fixed upon the rock-shaft R, in the position shown, is a downward-extending arm R'. On the rock-shaft G is a short downward-extending arm G$^8$, in the relative position shown for example in Fig. 3, and see Fig. 68. Pivotally connected at opposite ends, respectively, to the arm R' and arm G$^8$ is a connecting-rod R$^2$. In the rocking of the shaft G, as before described, the shaft R is rocked through the medium of the rod R$^2$. Loosely mounted upon the shaft R is an arm R$^3$, and fixed to the shaft G is a downward and backward-extending arm G$^9$. See Figs. 3 and 79.

R$^4$ is a rod pivotally connected at opposite ends, respectively, with the free end of the arm G$^9$ and lower end of the arm R$^3$. Loose upon the shaft R between the arms R' R$^3$ is a sleeve R$^5$, carrying a ratchet-wheel R$^6$, and a cam R$^7$. The ratchet-wheel is shown in detail in Fig. 79, and the cam in Figs. 68 and 69. The ratchet-wheel R$^6$ is provided in its circumference with five notches $c$ equi-distant apart. On the arm R$^3$ is a spring-pawl $c'$ adapted to engage the notches $c$ of the wheel R$^6$, when the rod R$^4$ is plunged in the upward direction, and to disengage the notches and ride upon the wheel when the rod R$^4$ is plunged in the downward direction. Fixed to a sleeve P$^6$ integral with the hanger P$^4$ is a forward-extending bracket P$^5$ (see Figs. 66, 79 and 80,) carrying a spring-dog $c^2$ adapted to engage the notches $c$ when the pawl is moved in the backward direction, under the downward plunge of the rod R$^4$, and to release the notches and ride upon the wheel when the latter is moved in the positive direction under engagement with it of the pawl $c'$ in the upward plunge of the rod R$^4$. In each rocking movement of the shaft G the wheel R$^6$ and cam R$^7$ are thus turned upon the shaft R one-fifth of a revolution.

Mounted to slide in the V-shaped guides $d$ of the blocks P' P$^2$, is a comparatively heavy metal assembler S having a central sleeve-portion S' and side block-portions S$^2$, S$^2$. The parts S$^2$ project above the sleeve-portion and are there provided on their inner sides with recesses $b$, $b'$, $b^2$, $b^3$ and $b^4$, each pair of recesses in the same plane in opposite blocks forming a receptacle. In the direction from back to front of the machine the receptacles $b$, $b'$, $b^2$, $b^3$ and $b^4$ are rendered flaring, as indicated in Figs. 68 and 69, the flaring ends being in the direction of the front of the machine. Fastened in the sleeve-portion S' of the assembler, is a downward-extending rod S$^3$, provided at its lower end with an anti-friction wheel S$^4$, which rides upon the cam R$^7$. In the rotation of the cam, the assembler S is raised in the five movements, which make a complete revolution of the cam in four steps, from the position shown in Fig. 68 to the position shown in Fig. 69, and then dropped, in one step, again to the position shown in Fig. 68. When in the last-named position the topmost receptacle $b^4$ registers with the guide-grooves $t^{29}$. In the first step the receptacle $b^3$ is raised to the plane of the said guide-grooves; in the second movement the receptacle $b^2$ is raised to the plane of the said grooves; in the third step the receptacle $b'$ is raised to the plane of the guide-grooves; in the fourth step the receptacle $b$ is raised to the plane of the guide-grooves; and in the last step, owing to the abrupt surface of the cam R$^7$, the assembler is dropped to its initial position, whereby the receptacle $b^4$ registers with the said guide-grooves.

In the operation of the machine, as hereinafter more clearly explained, one stick of gum follows another so that there are five sticks being operated upon in the machine at once. When the assembler S is in the position shown in Fig. 68 the feed-bars M in their backward movement cause the stick of gum which, as before stated, is confined at opposite ends in the guide-grooves $t^{29}$, to be engaged by the pins or stops $h^{10}$ and slid from the said guide-grooves into the receptacle $b^4$. Thus in successive backward movements of the feed-bars the next stick of gum is moved into receptacle $b^3$, the next into receptacle $b^2$ and the fourth into receptacle $b'$. The next stick will have been turned by the reversing mechanism described and will be moved from the guide-grooves into the receptacle $b$. As hereinafter explained the first stick of gum passed into the assembler will be placed into receptacle $b$, after which the block will drop and the last of the five sticks will be placed in the receptacle $b'$, for reasons hereinafter explained.

When the receptacles of the assembler are filled with five pieces of gum, as described, the pieces are ejected in a body from the assembler by mechanism now to be described.

Secured against the outer sides of the blocks $P'$ $P^2$, and extending in the direction longitudinally of the machine, are parallel bearing-pieces $T$ $T'$ of the same size and shape, and shown in detail in Fig. 71. Each bearing-piece is provided with bearing-sleeves $a$ $a'$ through which extends a longitudinally reciprocating-rod $a^2$. Fixed to each rod $a^2$ between the bearings $a$ $a'$ is a block $a^3$, shown in detail in Fig. 72, the blocks $a^3$ having lower bearing-openings $a^4$ and upper openings $a^5$. The blocks are tied together by a rod $a^6$, fixed at opposite ends in the openings $a^5$. On opposite ends of the shaft R and rigidly secured thereto are upwardly extending arms $R^9$. (See Figs. 66, 67, 68 and 73.) In their upper ends the arms $R^9$ are provided with elongated openings $R^{10}$ (see Fig 73), at which they fit over studs or pins $a^7$ on the blocks $a^3$. In the rocking of the shaft R, the arms $R^9$ are swung at their free ends back and forth, and by their engagement with the blocks $a^3$ move the latter and the rods $a^2$ back and forth in the bearings $a$ $a'$, the movement of the blocks $a^3$ being from the bearings $a$ to $a'$ and back again.

Journaled at opposite ends in the openings $a^4$ of the blocks $a^3$ is a rock-shaft $a^8$. On the said rock-shaft is a collar $a^9$, and fastened at one end to the collar, and surrounding the shaft, is a spring $a^{10}$ fastened at its opposite end to the adjacent block $a^3$. Extending from the rock-shaft $a^8$, near one end of the latter, is a pin $a^{11}$. The tendency of the spring $a^{10}$ is to turn the shaft $a^8$ in its bearings, and to cause the pin $a^{11}$ to impinge against the rod $a^6$, as indicated in Figs. 66 and 74. Extending from the shaft $a^8$ in planes just within the inner edges of the blocks $S^2$ of the assembler are ejector arms $a^{12}$ $a^{12}$. When the pin $a^{11}$ impinges against the rod $a^6$, the ejector-arms $a^{12}$ extend in the forward direction in the horizontal plane, as indicated in Figs. 68 and 69; also upon the shaft $a^8$ is a short pin $a^{13}$, extending in the relative position shown. Fixed upon the shaft $a^8$ near the pin $a^{11}$, is a collar $a^{14}$ having a single peripheral notch $a^{15}$, (see Figs. 74, 75 and 76) and on the rod $a^6$ is a loose dog $a^{16}$, of the form shown in the same figures. Upon the upper surface of the part $P'$ of the bracket P, is a backward extending spring-stop $a^{17}$. (See, for example, Figs. 75, 76 and 77.) On the upper surface of the part $S^2$ of the assembler, adjacent to the part $P'$ of the bracket-frame, is a stop-projection $a^{18}$, in the relative position indicated, for example, in Fig. 67, and further shown in Figs. 68, 69 and 70. Fastened against the outer surface of the blocks $P'$ $P^2$ of the bracket are spring-jaw channel-pieces V, affording together a receptacle in the plane of the assembling-receptacles when the latter are in their most elevated positions. At its forward end the receptacle V is of a size equal to all of the assembling-receptacles, and the backward projecting upper and lower springs V' contract in the backward direction, as shown, for example, in Figs. 68 and 69.

In the movement of the rock-shaft R, as before described, and consequent movement of the assembler, and frame, consisting of the blocks $a^3$ and parts carried thereby, the operation is as follows: As the assembler is raised, to cause the lowest receptacle $b$ to register with guide-grooves $t^{29}$, the stop $a^{18}$ rises into the path of the lower end of the pin $a^{13}$. As before stated, the first stick of gum placed in the assembler is the one which has been reversed by the reversing-mechanism, and is passed into the lowermost receptacle $b$, and then the assembler drops so that the next stick is placed in the receptacle $b^4$, and the last of the five sticks in the receptacle $b'$. Therefore when the assembler rises to cause its receptacle $b$ to register with the grooves $t^{29}$, the receptacles are full. The stop $a^{18}$ rises into the path of the pin $a^{13}$ when the block $a^3$ and attendant parts are moving from the backward limit of their traverse toward the forward limit, so that as they reach the forward limit of their traverse, the pin $a^{13}$ is engaged by the stop $a^{18}$ and the shaft $a^8$ turned against resistance of the spring $a^{10}$ a quarter revolution, causing the ejector-arm $a^{12}$ to extend vertically downward. In the next backward movement of the blocks $a^3$, therefore, the ejector-arms $a^{12}$ engage the five wrapped sticks of gum in the assembler and eject them all at once into the receptacle V. The shaft $a^8$ is held in position to which it is turned against resistance of its spring by engagement of the dog $a^{16}$ with the notch $a^{15}$ of the collar $a^{14}$, as shown in Fig. 76, and in the backward movement of the ejector, the dog, being down, wipes across the spring-stop $a^{17}$ until it passes the latter. In the next initial forward movement of the ejector-arm, the dog is caught at its shoulder $a^{19}$ by the end of the spring $a^{17}$ and caused to release the notch $a^{15}$ and become disengaged from the collar $a^{14}$, whereby the spring $a^{10}$ may act to return the shaft $a^8$ and ejector-arms to their normal horizontal positions.

The machine is belted to a power-shaft at the fast and loose-pulleys $B^2$, and the various gears, cams, shafts and other mechanisms operate as described, and in unison, to wrap the sticks of gum as hereinafter more concisely explained.

The sticks of gum Z to be wrapped are placed in the reservoir H', as shown for example in Fig. 1, and fed by gravity to the platform H. The wrapping paper is cut to the proper size, and a stack of the paper is placed upon the paper feed plate I'. To render it easy to place the stack upon the feed-plate, the forward, vertical rod $q^6$, which is pivoted upon the shelf, as explained, may be turned downward out of the way, against the resistance of the spring $q^7$. The spring will hold the rod $q^6$ with sufficient force in the vertical position to hold the forward edges of the strips of paper Y, which compose the stack, in place against the guide-rods $q'$. To insert the stack the spring-jaw nut I is grasped at its handles, disengaged from the threads of the screw $p$, and lowered; and when the stack is placed in positon upon the feed-plate I', the spring-jaw nut is raised by disengaging it from the screw until the topmost sheet of the stack is in the proper plane to be engaged and turned by the turning-mechanism. While the topmost sheet is being turned to a position at right-angles to the stack by the turning-mechanism, as before described, in the first stage of the revolution of the drive-shaft, the feed-plate or discharger $H^2$ on the platform H is moved in the backward direction, to slide the lowermost stick of gum from the reservoir onto the platform to a position against the stops $s^4$. In the second stage of the revolution of the drive-shaft the sheet-transferring arms $k^4$ are swung backward, to carry the sheet to the stops $L^2$ at the initial folding-mechanism over the plunger-plate $E^9$ and returned to their initial position; and the stick-transferring mechanism engages the stick that has been fed out upon the platform H and transfers it to the plunger-plate $E^9$, following the latter down to the lower plane, as before explained. The transferring-mechanism remains in the position last described for a short period, owing to the shape of the cam $K^2$, (see Figs. 32 to 35,) and during that period the rock-shaft D is turned by the action of the spring $D^{10}$, to slide the initial folding bar $D^{14}$ over the forward edge of the stick of gum, turning over the forward edge of the wrapping paper, as shown in Figs. 41 and 84. The gum-transferring mechanism is then raised and started on its return movement to the platform H, the initial folding-plate $D^{14}$ operating to hold down the stick of gum while the points of the transferring-mechanism are being withdrawn from the latter. Just as the points are released from the gum, as stated, the feed-bars M, having reached their forward position, rise, engage the forward edge of the partially wrapped stick with the stops $h$ and move in the backward direction. While the gum-transferring mechanism is passing to the plunger-plate with the stick of gum, as described, the vertically reciprocating-rod $m^4$ of the paper turning-mechanism is plunged downward and commences to turn on its axis to turn the topmost sheet of paper at the instant the gum-transferring mechanism starts to rise as explained. While the gum-transferring mechanism is traveling from the platform H to the plunger plate the sliding feed-plate $H^2$ moves to transfer another stick of gum from the reservoir to the platform against the stop $s^4$. As soon as the stick at the initial folding-mechanism has passed beneath the plate L, to produce the second fold, as shown in Fig. 85, the initial folding-plate $D^{14}$ moves from the position shown in Fig. 41, forward to the position shown in Fig. 40, and the paper transferring-rods $k^4$ swing backward to feed the second turned sheet to the initial folding-mechanism. As the gum-transferring mechanism rises from between the bar $D^{14}$ and guide-plate L, the plunger-plate follows it upward to the position, wherein its upper surface is in the plane of the top of the bar $D^{14}$, as shown in Fig. 39. Thus the action of feeding the sheets of paper (after being turned) to the initial folding-mechanism, and the depositing thereon of sticks of chewing gum (taken from the platform H by the gum-transferring-mechanism); the making of the side-folds of the wrapper, as shown in Fig. 85, and the movement of the stick thus wrapped in the direction of the second, or initial end-folding mechanism, are brought about in one revolution of the drive-shaft; and during the latter part of the same revolution the feed-plate $H^2$ is returned to its forward position and the next sheet of wrapping paper is turned into position to be engaged by the sheet-transferring rods $k^4$. In one revolution of the drive-shaft the gum-stick, after leaving the initial folding-mechanism, is passed beneath the plate L to the initial end-folding mechanism, which, when the stick passes to it is in the raised position shown in Fig. 42, and the said mechanism is plunged downward to the position shown in Fig. 43, caused to remain in that position momentarily and then raised to its initial position. When the initial end-folding mechanism has reached its lowered position shown in Fig. 43, and while still in said position, the feed-bars M rise and move the stick in the direction of the second end-folding mechanism, which as before described, turns the ends upward against the under surface of the stick, as shown in Fig. 87. The initial end-folding mechanism remains in the lowered position until the gum-stick has passed from beneath it, whereby the downward projecting parts $N^3$ of the said mechanism operate to guide the downward-extending ends of the wrapper into the slots $r^{28}$ to the openings $r^{19}$ at the secondary end-folding mechanism. In one revolution of the drive-shaft the folder-plates $g^6$ $g^7$ are plunged from their outer position, shown in Figs. 48 and 50, toward each other to the position shown in Fig. 51, caused to remain in the latter position for a time and then plunged back to their initial positions. In their movement in the direction of each other they fold the ends of the wrapper from the position shown in Fig. 86 to that shown in Fig. 87, and while the plates remain at the limit of their plunge, the feed-bar M rises and moves the gum-stick to the reversing-mechanism shown in Fig. 57. If it is the first stick, it is reversed or upset, as before described, by the said reversing-mechanism. In each revolution of the drive-shaft the shaft G is rocked once and the ratchet-wheel $e^3$ is turned one-fifth of a revolution, as before described. In every fifth revolution of the drive-shaft, the pawl $e^7$ engages the deep notch $e^5$ of the ratchet $e^3$, and comes into engagement with a tooth of the ratchet $e^2$, to turn the shaft $e$ one-fifth of a revolution, to produce, as before described, one-half of a revolution of the shafts carrying the channel-pieces $f^2$, in which the gum stick is held at its opposite ends. In the one revolution of the drive-shaft, the feed-bars M slide the wrapped gum-stick from the reversing-mechanism to the guide-grooves $t^{29}$, afforded by the plates $t^{28}$, and in another revolution of the drive-shaft the feed-bars M slide the wrapped gum-stick into one of the receptacles of the assembler S.

The mechanism which moves the assembler is so adjusted with relation to the stick reversing-mechanism that the stick which has been reversed, as described, is moved into the lowermost receptacle $b$. In other words, the assembler is in position wherein the receptacles $b$ register with the guide-grooves $t^{29}$ in the second revolution of the drive-shaft, following the movement of the reversing-mechanism. In the next revolution of the drive-shaft the assembler drops to the position wherein the uppermost receptacle $b^4$ registers with the guide-grooves $t^{29}$.

In forming the packet shown in Fig. 89 the wrapped stick of gum which is discharged by the feed, enters the assembler while the latter is in its highest position (see Fig. 89) and this stick, which is the one that has been reversed, and is the lowermost of the packet illustrated in Fig. 89, is passed into the receptacle $b$. Following this, the first operation, and while the feed bars are moving in the forward direction, the cam $R^7$ is turned one-fifth of a revolution in the direction of the arrow in Fig. 68 to the position shown in that figure, causing the assembler to drop to its lowermost position. The second stick of the packet is passed into the receptacle $b^4$, the third into the receptacle $b^3$, the fourth into the receptacle $b^2$, and the last into the receptacle $b'$, the assembler being raised by the cam $R^7$ one step after each said operation. When the assembler has been thus filled and then raised to its highest position shown in Fig. 69, the ejector is swung down as described while the cam $R^7$ is completing its movement. It is to be understood that Fig. 69 shows the cam $R^7$ not quite at the end of a movement, and that before stopping it moves slightly beyond the position there shown but without raising the assembler any further. During the final part of the movement of the cam the stop $a^{18}$ engages the pin $a^{13}$ and swings down the ejector-arm as before explained. While the next reversed stick of wrapped gum is being passed to the receptacle $b$, the ejector forces the packet into the final receptacle V.

The operation of the machine is therefore continuous, the stick being fed from the reservoir, folded in its wrapper and placed in the assembler in six revolutions of the drive-shaft.

As each revolution brings in a new stick of gum and its wrapper, the sticks follow each other through the machine in rapid succession, and in every fifth revolution the assembler is filled and the discharger arms $a^{12}$ swing down and move in the backward direction, as before described, to discharge the five assembled sticks into the receptacle V. From the receptacle V the bunch of sticks may be withdrawn by hand and a rubber band $x$, Fig. 89, slipped over them, as shown.

In operating the machine, it is necessary only to keep the reservoir supplied with sticks of gum and the paper feed-mechanism supplied with wrapping sheets. All the operations which follow are automatic until the bunched sticks are deposited in the receptacle V.

The machine shown requires that one or more attendants remove the bunches from the receptacle V as fast as they are formed.

The machine may be run at a high speed, and, as all the mechanisms are positive in their actions, it will run continuously with comparatively little attention.

The machine as designed is especially compact in its structure, while each part is in a position which makes its easily accessible.

What we claim as new, and desire to secure by Letters Patent, is—

1. In a wrapping-machine, the combination with the driving-mechanism, of feed-mechanism for guiding and advancing a wrapping-sheet, with the article to be wrapped therein, intermittingly through the machine, folding-mechanisms along the path of the sheet, actuated from the said driving-mechanism, successively to engage and bend the sheet to produce side-folds and end-folds over the said article, an assembler for a predetermined number of the wrapped articles, operating to form them into a packet and discharge-mechanism operating, when the assembler is filled, to expel the packet bodily, substantially as described.

2. In a wrapping-machine, the combination with the driving-mechanism, of feed-mechanism for guiding and advancing a wrapping-sheet, with the article to be wrapped therein, intermittingly through the machine, folding-mechanisms along the path of the sheet, actuated from the said driving-mechanism, successively to engage and bend the sheet to produce side-folds and end-folds over the said article, upsetting mechanism beyond the said folding-mechanisms, operating to engage and reverse one in each predetermined number of wrapped articles, an assembler for a predetermined number of the wrapped articles, and discharge-mechanism operating, when the assembler is filled, to expel all the assembled articles therefrom at once, substantially as described.

3. The combination with the sheet-turning mechanism, of means for feeding sheets thereto, comprising a support I', a screw $p$, an opening and closing adjustable spring-jaw nut upon the screw with which the said support is connected, a shaft $p^5$ geared to the said screw for turning it, a ratchet $p^7$ on said shaft, a lever fulcrumed upon the shaft and carrying a pawl engaging the said ratchet, a drive-shaft, a cam $B^7$ upon the drive-shaft, and operating in each revolution to engage and turn the said lever, feed-regulating means, comprising a rod $p^{13}$ having an arm $p^{16}$ to impinge against the stack in each operation, and a spring tending normally to press the said arm in the direction of the stack and the said lever against the cam, the whole being constructed to operate substantially as and for the purpose set forth.

4. In a wrapping-machine, the combination with the drive-shaft, sheet-folding mechanism and support for a stack of sheets of oblong form, of means for feeding a sheet from the stack to the folding-mechanism, comprising intermittent sheet-turning mechanism, actuated from the drive-shaft to engage and turn a sheet, whereby the sheet will project at its ends beyond opposite sides of the stack, and sheet-transferring mechanism following the action of the said turning-mechanism to engage the turned sheet at its projecting ends and move it to the said folding mechanism, substantially as described.

5. In a wrapping-machine, the combination with the drive-shaft, sheet-folding mechanism and support for a stack of sheets of oblong form, of means for feeding a sheet from the stack to the folding mechanism, comprising a turning and vertically-reciprocating friction-piece operating to engage the top sheet of the stack and turn it approximately a quarter revolution, whereby it projects at its ends beyond opposite sides of the stack, and means following the action of the turning mechanism for engaging the projecting ends of the turned sheet and transferring the sheet to the folding-mechanism, substantially as described.

6. In a wrapping-machine, the combination with the drive-shaft, sheet-folding mechanism and support for a stack of sheets of oblong form, of means for feeding a sheet from the stack to the folding mechanism, comprising a vertically disposed rod mounted in guides and provided at its lower end with a sheet-engaging friction-piece, a spring tending normally to press the rod in the downward direction, means for turning the rod on its axis and for raising it in its guides actuated from the drive-shaft, whereby the topmost sheet of the stack is engaged by the friction-piece and turned approximately a quarter revolution in each operation, and means, following the action of the turning mechanism for engaging the projecting ends of the turned sheet and transferring the sheet to the folding mechanism, substantially as described.

7. In a wrapping-machine, the combination with the drive-shaft and sheet-folding mechanism, of means for feeding an oblong sheet to the folding mechanism, comprising an intermittingly raising support adapted to receive a stack of the sheets, guides for the support, retaining guides for the stack, intermittent sheet-turning mechanism actuated from the drive-shaft to engage and turn the topmost sheet of the stack, whereby the ends of said sheet project beyond opposite sides of the stack, and sheet-transferring arms, movable at opposite sides of the stack and following the action of the said turning mechanism to engage the said sheet at its ends and move it from the stack to the folding-mechanism, substantially as described.

8. In a wrapping machine, the combination with the drive-shaft and sheet-folding mechanism, of a support for a stack of oblong sheets provided with means for raising it intermittingly, means for turning the topmost sheet, whereby the said sheet will project at its ends beyond the sides of the stack, comprising a rod $m^4$, mounted in guides, and provided at its lower end with a friction-piece $m^6$, a spring on the rod tending normally to press the friction-piece to the stack, a shaft $n^5$ geared to the drive-shaft, a crank on the said shaft and a crank on the said rod linked together, whereby in the rotation of the shaft, the rod is rocked on its axis, a cam on the shaft $n^5$, and a pivotal lever engaging the said cam and rod, whereby in the rotation of the cam, the rod is raised against the resistance of the said spring, and means following the action of the said turning mechanism, to engage the projecting ends of the turned sheet, and transfer it to the said folding-mechanism, substantially as described.

9. The combination with the drive-shaft, stack-support and means for turning a sheet Y, to project at its ends beyond opposite sides of the stack, of means for sliding the turned sheet from the stack, comprising a rock-shaft $k$, rocking means for the said shaft actuated from the drive-shaft, and rods $k^4$ fastened to the rock-shaft and movable across opposite sides of the stack, to operate substantially as described.

10. The combination with the stack-support, means for turning the topmost sheet Y of the stack, to project at its ends beyond opposite sides of the stack, and sheet-folding mechanism, of means, following the action of the turning mechanism to slide the turned sheet from the stack to the said folding-mechanism, guides $k^5$ for the upper surface of the sheet, and guides $k^6$ for the under surface of the sheet, substantially as described.

11. In a wrapping-machine, the combination with the mechanism for folding a wrapping-sheet over the article to be wrapped, of a reservoir for said articles, a support for one of said articles, means for discharging an article from the reservoir and positioning it on the support, and means for transferring the article from said support to the said folding-mechanism, comprising a reciprocating carrier, movable between the said support and folding-mechanism, and provided with automatic article penetrating and engaging means, which take hold of the article at said support, and means at the folding-mechanism, for holding the article while the penetrating engaging means are withdrawn therefrom substantially as described.

12. In a wrapping-machine, the combination with a support for the article to be wrapped and mechanism for folding a wrapping-sheet about the said article, of means for transferring the article from the said support to the folding-mechanism, comprising a reciprocating frame, movable between the support and folding-mechanism, and provided with a spear point to engage the article at the support, and an initial folding bar at the folding mechanism to engage and hold the article while the spear-point is being withdrawn therefrom, substantially as described.

13. In a wrapping-machine, the combination with the drive-shaft, a support for the article to be wrapped, and mechanism for folding a wrapping-sheet about the article, of means for transferring the article from the said support to the folding-mechanism, comprising arms pivotally mounted to swing in the vertical plane, a frame $K^8$ pivotally mounted on said arms, a block on the frame provided with a spear point, the said arms being actuated from the drive-shaft to swing the frame at its spear-point between the said support and folding-mechanism, whereby the spear-point engages the article at the support and carries it to the folding-mechanism, and means for disengaging the article from the spear-point at the folding mechanism, substantially as described.

14. In a wrapping-machine, the combination with the drive-shaft, support H for the article to be wrapped, and mechanism for folding a wrapping-sheet about the article, of means for transferring the article from the said support to the folding-mechanism, comprising bell-crank levers $i'$ $i^5$, pivotally mounted between their ends to swing in the vertical plane, a frame $K^8$ pivotally connected at opposite ends to the upper arms of the bell-crank levers, a head on the frame provided with one or more spear-points, a tie-rod $i^8$ connecting the lower arms of the bell-crank levers, a spring tending normally to swing the frame and bell-crank levers in one direction, and intermittingly actuated means operated from the drive-shaft to move the frame and levers against the resistance of the spring, the parts being constructed and arranged to operate substantially as described.

15. In a wrapping-machine, the secondary end-folding mechanism for the wrapper comprising, in combination, reciprocating folder plates $g^6$ $g^7$, mounted in guides, and means for reciprocating the plates, comprising the pivotal levers $g^4$ and $g^5$, pivotally connected respectively with the plates, pivotal lever $g'$ connected with the lever $g^5$, rotary shaft K, cam $K^3$ on said shaft and spring $g^3$, constructed and arranged to operate substantially as described.

16. In a wrapping-machine, the combination with the drive-shaft, feed-mechanism for engaging the article and its wrapper, and advancing them intermittingly through the machine, of side-folding and end-folding mechanisms in the path of the wrapper, an assembler into which the wrapped article is deposited by the feed, and intermittent reversing-mechanism for the wrapped article between the folding-mechanism and assembler, the mechanisms being actuated from the drive-shaft and timed to operate substantially as and for the purpose set forth.

17. In a wrapping-machine, the combination with the wrapper-folding mechanisms, of an assembler, feed-mechanism for engaging and advancing the article and wrapper through the folding-mechanisms and for depositing the wrapped article in the assembler, and reversing mechanism for the wrapped article, comprising shafts at opposite sides of the path of the article provided with channel-pieces affording guides for the ends of the article, and intermittent means for turning the said shafts a half revolution, said mechanisms being timed to operate substantially as described.

18. In a wrapping-machine, reversing-mechanism for the wrapped article, comprising shafts $f$ provided with channel-pieces $f^2$, affording guides for the ends of the article, a shaft $e$ to which the shafts $f$ are geared, and means for turning the shaft $e$ intermittingly to turn the shafts $f$ a half revolution, substantially as described.

19. In a wrapping-machine, the combination with the drive-shaft, wrapper-folding mechanism, and means for advancing the wrapped article through the machine, of reversing mechanism for the wrapped article comprising shafts $f$ provided with channel-pieces $f^2$, a shaft $e$ to which the shafts $f$ are geared, and pawl and ratchet mechanism on the shaft $e$ actuated from the drive-shaft, operating in every one of two or more predetermined revolutions of the drive-shaft to turn the shaft $e$, substantially as and for the purpose set forth.

20. In a wrapping-machine, the combination with the drive-shaft, folding-mechanism for the wrapper, and means for advancing the article through the machine, of reversing mechanism in the path of the article, comprising guide-pieces which engage the ends of the wrapped article, a shaft $e$ to which the said guide-pieces are geared, and means for turning the said shaft, comprising a ratchet-wheel $e^2$ fixed to the shaft, a ratchet wheel $e^3$ having one deep notch $e^5$, a pawl operating to engage and turn the ratchet $e^3$ one notch with each operation, and turn both the ratchets $e^3$ and $e^2$ when it engages the deep notch $e^5$, and operating means for the pawl actuated from the drive-shaft, substantially as described.

21. In a wrapping-machine, the combination with the drive-shaft, of the rotary shafts $f$, channel-pieces $f^2$ thereon affording guides $f^3$, pinions $f^4$ on the shafts $f$, shaft $e$, gears $e'$ thereon engaging the pinions $f^4$, ratchets $e^2$ $e^3$ on the shaft $e$, dog $e^8$, lever $e^6$ on the shaft $e$ carrying the pawl $e^7$ to engage the ratchets, and means actuated from the drive-shaft for swinging the said lever, the parts being constructed and arranged to operate substantially as and for the purpose set forth.

22. In a wrapping-machine, the combination with the drive-shaft, of feed-mechanism for intermittingly engaging and advancing the wrapped article through the machine, comprising bars M formed with lower members M′ having wedge-lugs $h$, upper members $M^2$ having wedge-engaging cam-sockets $h^4$, stops for limiting the relative movements of the members, article-engaging stops upon the members $M^2$, and reciprocating mechanism connected with the upper members $M^2$, and actuated from the drive-shaft, substantially as described.

23. In a wrapping-machine, the combination with the drive-shaft, of feed-mechanism for intermittingly engaging and advancing the wrapped article through the machine, comprising a reciprocal block mounted in guides and actuated from the drive-shaft, feed bars M comprising lower members M′ provided with wedge-lugs $h$ and stops $h^2$ and mounted in friction-guides, and upper members $M^2$ having wedge-engaging cam-sockets $h^4$, and article-engaging stops, and connected with the said reciprocal block, substantially as described.

24. In a wrapping-machine, the combination with the folding-mechanism for the wrapper and intermittent-feed mechanism for engaging and discharging the wrapped article from the machine, of an assembler at the discharge end of the machine provided with a series of receptacles for the wrapped articles, the assembler being movable to register at one of its receptacles with the path of said articles in each operation, substantially as and for the purpose set forth.

25. In a wrapping-machine, the combination with the folding-mechanism for the wrapper and intermittent-feed mechanism for engaging and discharging the wrapped article from the machine, of an assembler at the discharge end of the machine, comprising a vertically movable block provided with a number of receptacles for the wrapped articles, the block being movable to register at a new receptacle with the path of the article in each operation, substantially as and for the purpose set forth.

26. In a wrapping-machine, the combination with the folding-mechanism for the wrapper and intermittent-feed mechanism for engaging and discharging the wrapped article from the machine, of an assembler for a predetermined number of the wrapped articles movable across the path of said articles, and an intermittingly actuating discharger for expelling the assembled wrapped articles in a body from the assembler, substantially as described.

27. In a wrapping-machine, the combination with the folding-mechanism for the wrapper and intermittent-feed mechanism for engaging and discharging the wrapped article from the machine, of an assembler mounted in vertical guides at the discharge end of the machine and provided with a series of receptacles, means for moving the assembler, to bring a new receptacle into the path of the wrapped articles, and a discharger for expelling the articles in a body from the receptacles, substantially as described.

28. In a wrapping-machine, the combination with the folding-mechanism for the wrapper and intermittent-feed mechanism for engaging and discharging the wrapped article from the machine, of an assembler comprising a vertically movable block S, mounted in guides at the discharge-end of the machine, and provided with receptacles $b$ $b'$ $b^2$ $b^3$ $b^4$, means for moving the block by steps to register with its receptacles successively with the path of the wrapped article and then moving the block the distance of all the receptacles across said path, and means for engaging and discharging the wrapped articles in a body from the assembler when the assembler is filled, substantially as described.

29. In a wrapping-machine, the combination with the folding-mechanism for the wrapper and intermittent-feed mechanism for engaging and discharging the wrapped article from the machine, of an assembler comprising a vertically movable block S, mounted in guides at the discharge-end of the machine, and provided with receptacles $b$ $b'$ $b^2$ $b^3$ $b^4$, means for moving the block by steps to register at its receptacles successively with the path of the wrapped article and then moving the block the distance of all the receptacles across said path, means for engaging and discharging the wrapped articles in a body from the assembler when the assembler is filled, and a receptacle V beyond the assembler into which the assembled articles are discharged, substantially as described.

FRANK B. REDINGTON.
CHARLES U. TROWBRIDGE.

In presence of—
M. J. FROST,
J. W. DYRENFORTH.